(12) United States Patent
Ikawa et al.

(10) Patent No.: US 7,843,869 B2
(45) Date of Patent: Nov. 30, 2010

(54) ROADSIDE TO VEHICLE COMMUNICATION SYSTEM

(75) Inventors: Masahiko Ikawa, Tokyo (JP); Yukio Goto, Tokyo (JP); Hiroyuki Kumazawa, Tokyo (JP); Yoshiaki Tsuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 606 days.

(21) Appl. No.: 10/568,346

(22) PCT Filed: Oct. 1, 2004

(86) PCT No.: PCT/JP2004/014490

§ 371 (c)(1),
(2), (4) Date: Feb. 14, 2006

(87) PCT Pub. No.: WO2005/039075

PCT Pub. Date: Apr. 28, 2005

(65) Prior Publication Data

US 2006/0193282 A1    Aug. 31, 2006

(30) Foreign Application Priority Data

Oct. 15, 2003    (JP) .............................. 2003-355354

(51) Int. Cl.
*H04W 4/00* (2009.01)
(52) U.S. Cl. .................. 370/328; 370/389; 370/392
(58) Field of Classification Search .......... 340/991, 340/992, 993, 989, 995.14, 426.19; 370/355, 370/356, 389, 351; 709/231, 236, 237
See application file for complete search history.

(56) References Cited

U.S. PATENT DOCUMENTS

| | | | | |
|---|---|---|---|---|
| 5,424,727 | A * | 6/1995 | Shieh | 340/928 |
| 6,081,718 | A * | 6/2000 | Ando et al. | 455/447 |
| 6,496,502 | B1 * | 12/2002 | Fite et al. | 370/389 |
| 6,597,278 | B1 * | 7/2003 | Ando | 340/5.25 |

(Continued)

FOREIGN PATENT DOCUMENTS

CN    1273394 A    11/2000

(Continued)

OTHER PUBLICATIONS

Dedicated short-Range Communication System: ARIB STD-T75, published by the Association of Radio Industries and Businesses on Sep. 9, 2001. See whole document.*

(Continued)

*Primary Examiner*—Michael J Moore, Jr.
(74) *Attorney, Agent, or Firm*—Leydig, Voit & Mayer, Ltd.

(57) ABSTRACT

A roadside-to-vehicle communication system for providing a mobile station with application service by utilizing roadside-to-vehicle communication implemented between the mobile station that travels on a road and a base station system installed along the road provides non-network-type communication protocols that can implement diverse application services, even when the mobile station is moving. The roadside-to-vehicle communication system includes transfer service processing entities for implementing data transfer among applications and transaction management entities that have undelivered data resenders, data send/receive for each message, and a message segmenter/assembler that provides unidirectional data transmission and request-response transaction services.

7 Claims, 42 Drawing Sheets

U.S. PATENT DOCUMENTS

| | | | |
|---|---|---|---|
| 6,711,623 B1 | 3/2004 | Furukawa et al. | |
| 6,756,915 B2 * | 6/2004 | Choi | 340/928 |
| 6,791,475 B2 * | 9/2004 | Yamashita | 340/935 |
| 6,829,531 B2 * | 12/2004 | Lee | 701/205 |
| 6,834,326 B1 * | 12/2004 | Wang et al. | 711/114 |
| 6,861,958 B2 * | 3/2005 | Kasagi | 340/928 |
| 7,542,472 B1 * | 6/2009 | Gerendai et al. | 370/394 |
| 2003/0033418 A1 * | 2/2003 | Young et al. | 709/230 |
| 2003/0098992 A1 | 5/2003 | Park et al. | |
| 2003/0189924 A1 * | 10/2003 | Kadambi et al. | 370/360 |
| 2003/0200329 A1 * | 10/2003 | Delaney et al. | 709/237 |
| 2004/0017820 A1 * | 1/2004 | Garinger et al. | 370/419 |
| 2004/0073901 A1 | 4/2004 | Imamatsu | |

FOREIGN PATENT DOCUMENTS

| | | |
|---|---|---|
| JP | 2001-078258 A | 3/2001 |
| JP | 2001-186576 | 7/2001 |
| JP | 2001-298397 | 10/2001 |
| JP | 2002-271258 A | 9/2002 |
| JP | 2003-8643 A | 1/2003 |
| JP | 2003-032752 | 1/2003 |
| JP | 2003-188916 A | 7/2003 |
| JP | 2003-234688 A | 8/2003 |

OTHER PUBLICATIONS

Non-Patent Literature "DSRC in Japan, Status Report" published by the DSRC International Task Force, ITS Info-communications Forum on Dec. 2002.*

Non-Patent Literature "DSRC in Japan, Status Report" published by the DSRC international Task Force, ITS info communications Forum on Dec. 2002.*

"RFC 793-Transmission Control Protocol" published by the Network Working Group. Sep. 1981. See whole Document.*

"Dedicated Short-Range Communication System, ARIB Standard, Version 1.0", published Sep. 9, 2001 by ARIB. See whole Document.*

DSRC International Task Force published Dec. 11, 2002 by International Task Force.See whole Document.*

Hiraiwa et al., "Implementation and Evaluation of ARIB STD-T75 Based DSRC System," IPSJ SIG Technical Reports, Intelligent Transport Systems, Sep. 3, 2002, pp. 69-75.

Chiku et al.., "R&D on DSRC Platform—R&D on Sub-Platform for Low-Resource OBE-," World Congress on Intelligent Transport Systems, Paper No. 3562, Nov. 6, 2000, pp. 1-8.

* cited by examiner

FIG. 2

| LOCAL PORT NO. | APPLICATION | REMARKS |
|---|---|---|
| 0 | UNUSED | |
| 1 TO 0x07FF | SAME AS DEFINITION OF UDP PORT NUMBER | SAME AS PORT ASSIGNMENT FOR UDP APPLICATION SPECIFIED IN RFC 1700 |
| 0x0800 | UNUSED | |
| 0x0801 | DEFAULT NCP | RECEIVING PORT FOR BASE STATION APPLICATION IN TAG-TYPE TERMINAL |
| 0x0802 | ECHO | RECEIVING PORT FOR ECHO SERVICE |
| 0x0803 | ECHO REPLY | RECEIVING PORT FOR REPLY TO ECHO |
| 0x0804 TO 0x0807 | RESERVED FOR ID NOTIFICATION APPLICATION | RECEIVING PORT FOR APPLICATION IMPLEMENTING ID NOTIFICATION SERVICE FOR TERMINALS OTHER THAN TAG-TYPE TERMINAL |
| 0x0808 TO 0x080F | RESERVED FOR PUSH-TYPE DELIVERY APPLICATION | RECEIVING PORT FOR APPLICATION PROVIDING PUSH-TYPE INFORMATION |
| 0x0810 TO 0x085F | RESERVED FOR CHARGING/PAYMENT | RECEIVING PORT FOR APPLICATION IMPLEMENTING CHARGING SERVICE |
| 0x0851 TO 0x0FFE | RESERVED FOR DSRC NON-NETWORK-TYPE APPLICATION | |
| 0x0FFF | LOCAL PORT PROTOCOL MANAGEMENT SERVICE | RECEIVING PORT FOR LOCAL PORT PROTOCOL MANAGEMENT SERVICE |
| 0x1000 TO 0xFFFF | ARBITRARY PORT | |

FIG. 4

| PRIMITIVE TYPE | ABBREVIATION | DESCRIPTION |
|---|---|---|
| REQUEST | REQ | USED WHEN AN UPPER LAYER REQUESTS A SERVICE FROM A LOWER LAYER. |
| INDICATION | IND | USED WHEN A LOWER LAYER NOTIFIES AN UPPER LAYER OF A SERVICE FROM THE COUNTERPART. |

FIG. 5

| SYMBOL | DESCRIPTION |
|---|---|
| M (MANDATORY) | MANDATORY PARAMETER |
| O (OPTIONAL) | OPTIONAL PARAMETER |
| (=) | INDICATES THAT THE PARAMETER VALUE IS EQUIVALENT TO THE VALUE OF THE IMMEDIATELY PRECEDING PRIMITIVE ("REQ" IN THE CASE OF "IND"). |

FIG. 6

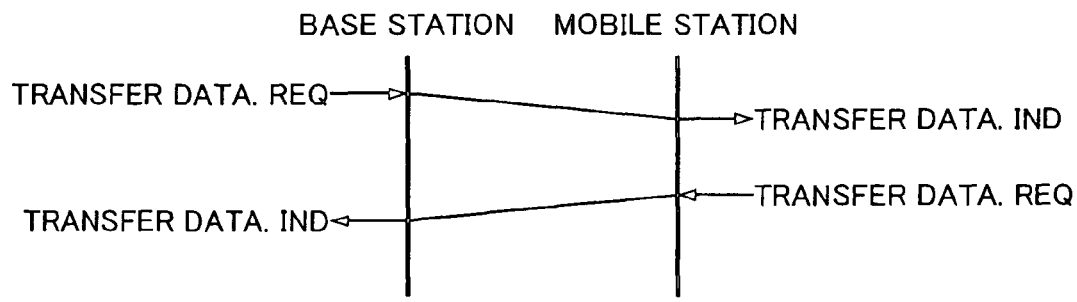

| PRIMITIVE PARAMETER | TRANSFER DATA | |
|---|---|---|
| | REQ | IND |
| LINK ADDRESS | M | M(=) |
| SOURCE PORT | M | M(=) |
| DESTINATION PORT | M | M(=) |
| USER DATA SIZE | M | M(=) |
| USER DATA | O | O(=) |

FIG. 9

| PRIMITIVE PARAMETER | EVENT REPORT | |
|---|---|---|
| | REQ | IND |
| LINK ADDRESS | - | M(=) |
| EVENT CODE | - | M(=) |
| EXTENTION PARAMETER | - | M(=) |

FIG. 10

| PRIMITIVE PARAMETER | OPEN PORT |
|---|---|
| | REQ |
| PORT | M |
| TYPE | O |
| CODE | O |

FIG. 11

| PRIMITIVE PARAMETER | CLOSE PORT |
|---|---|
| | REQ |
| PORT | M |

FIG. 12

| PORT NO | PRIMITIVE TYPES | EVENT CODES |
|---|---|---|
| | | |
| | | |
| | | |

FIG. 13

| LID | EQUIPMENT ID |
|---|---|
|  |  |
|  |  |
|  |  |

FIG. 14

|  | 7 (MSB) | 6 | 5 | 4 | 3 | 2 | 1 | 0 (LSB) |
|---|---|---|---|---|---|---|---|---|
| 1 | ACCESS POINT IDENTIFIER LOCAL PORT CONTROL (1) | | | | PROTOCOL IDENTIFIER MESSAGE (0) | | | |
| 2 | SOURCE LOCAL PORT NUMBER (HIGH-ORDER) | | | | | | | |
| 3 | SOURCE LOCAL PORT NUMBER (LOW-ORDER) | | | | | | | |
| 4 | DESTINATION LOCAL PORT NUMBER (HIGH-ORDER) | | | | | | | |
| 5 | DESTINATION LOCAL PORT NUMBER (LOW-ORDER) | | | | | | | |
| 6 | LENGTH OF USER DATA PORTION | | | | | | | |
|   | CONTENTS OF USER DATA PORTION | | | | | | | |

FIG. 15

| PROTOCOL IDENTIFIER | DESCRIPTION | OPTION FIELD TYPE |
|---|---|---|
| 0 | DATA TRANSFER | LPCP TRANSFER DATA PDU TYPE |
| 1 | EVENT NOTIFICATION | LPCP EVENT PARAMETER TYPE |
| 2-15 | RESERVATION |  |

FIG. 16

|   | 7 (MSB) | 6 | 5 | 4 | 3 | 2 | 1 | 0 (LSB) |
|---|---|---|---|---|---|---|---|---|
| 1 | ACCESS POINT IDENTIFIER LOCAL PORT CONTROL (1) | | | | PROTOCOL IDENTIFIER EVENT REPORT (1) | | | |
| 2 | EVENT CODE "EVENT CODE" | | | | | | | |
| 3 | LENGTH OF "EXTENSION PARAMETER" | | | | | | | |
|   | CONTENTS OF "EXTENSION PARAMETER" | | | | | | | |

FIG. 17

| EVENT CODE | DESCRIPTION | NOTIFICATION TARGET | CONTENTS OF "EXTENSION PARAMETER" |
|---|---|---|---|
| 0 | PROHIBITED TO USE. | | NONE |
| 1-3 | NOT USE. | | NONE |
| 4 | DATA SIZE HAS EXCEEDED THE UPPER LIMIT VALUE. | LOCAL STATION | |
| 5 | SENDING SERVICE HAS BEEN ABORTED | LOCAL STATION | |
| 6 | DESIGNATED GROUP BROADCAST ADDRESS IS INVALID. | LOCAL STATION | |
| 7-93 | RESERVED FOR FUTURE USE | | NONE |
| 94-95 | NOT USE. | | NONE |
| 96 | CONNECTION NOTICE | LOCAL STATION | STORE "USER PROFILE" TYPE PARAMETER |
| 97 | DISCONNECTION NOTICE | LOCAL STATION | STORE "USER PROFILE" TYPE PARAMETER |
| 98-127 | RESERVED FOR FUTURE USE | | |
| 128 | DSRC IS NOT CONNECTED. | LOCAL STATION | |
| 129 | DESTINATION PORT IS INVALID. | OPPOSITE STATION | STORE "INVALID PORT" TYPE PARAMETER |
| 130-255 | RESERVED FOR FUTURE USE | | |

FIG. 34

| PRIMITIVE TYPE | ABBREVIATION | DESCRIPTION FOR PRIMITIVE |
|---|---|---|
| REQUEST | REQ | USED WHEN AN UPPER LAYER REQUESTS A SERVICE FROM A LOWER LAYER. |
| INDICATION | IND | USED WHEN A LOWER LAYER NOTIFIERS AN UPPER LAYER OF A SERVICE FROM THE COUNTERPART. |
| RESPONSE | RES | USED WHEN AN UPPER LAYER GIVES A RESPONSE TO A LOWER LAYER FOR A SERVICE TO THE COUNTERPART. |
| CONFIRM | CNF | USED WHEN A LOWER LAYER NOTIFIES AN UPPER LAYER THAT THE REQUESTED SERVICE IS COMPLETED. |

FIG. 35

| SYMBOL | DESCRIPTION |
|---|---|
| M (MANDATORY) | MANDATORY PARAMETER |
| C (CONDITIONAL) | PARAMETER SPECIFIED WHEN SPECIFIED IN THE IMMEDIATELY PRECEDING PRIMITIVE ("REQ" IN THE CASE OF "IND", AND "RES" IN THE CASE OF "CNF") |
| O (OPTIONAL) | OPTIONAL PARAMETER |
| (=) | INDICATES THAT THE PARAMETER VALUE IS EQUIVALENT TO THE VALUE OF THE IMMEDIATELY PRECEDING PRIMITIVE ("REQ" IN THE CASE OF "IND", AND "RES" IN THE CASE OF "CNF"). |

FIG. 36

| PARAMETER / PRIMITIVE | INVOKE | | | |
|---|---|---|---|---|
|  | REQ | IND | RES | CNF |
| LINK ADDRESS | M | M(=) | - | - |
| SOURCE PORT | M | M(=) | - | - |
| DESTINATION PORT | M | M(=) | - | - |
| USER DATA SIZE | M | M(=) | M | M(=) |
| USER DATA | O | C(=) | O | C(=) |
| TRANSACTION TYPE | M | M(=) | - | - |
| REQUIRE ACK | O | - | O | - |
| RESULT TIMEOUT | O | - | - | - |
| HANDLE | M | M | M | M |

FIG. 37

| PARAMETER / PRIMITIVE | ABORT | |
|---|---|---|
|  | REQ | IND |
| ABORT TYPE | O | C(=) |
| ABORT CODE | O | C(=) |
| HANDLE | M | M |

FIG. 38

| ABORT CODE | CODE | DESCRIPTION |
|---|---|---|
| UNKNOWN | 0x00 | - |
| PROTOCOL ERROR | 0x01 | THE RECEIVED PDU STRUCTURE IS ABNORMAL. |
| TID IS INVALID. | 0x02 | THE TID IS INVALID. |
| TRANSACTION SERVICE IS NOT SUPPORTED. | 0x03 | THE RECEIVER DOES NOT SUPPORT THE REQUEST-RESPONSE TYPE TRANSACTION SERVICE. |
| LPP VERSION IS DIFFERENT. | 0x04 | THE LPP VERSION IS DIFFERENT BETWEEN THE SENDER AND THE RECEIVER. |
| RECEIVE BUFFER OVERFLOW | 0x05 | THE RECEIVE BUFFER HAS OVERFLOWED. |
| MTU ERROR | 0x06 | BECAUSE THE SEND DATA EXCEEDED THE MTU IN THE LPCP, THE TRANSACTION COULD NOT BE STARTED (WHEN SEGMENTATION/RE-ASSEMBLY PROCESSING IS NOT SUPPORTED). |
| RESEND TIMER TIMEOUT | 0x07 | THE RESEND TIMER EXPIRED, AND THE TRANSACTION WAS ABORTED. |
| RESULT TIMER TIMEOUT | 0x08 | THE RESULT TIMER EXPIRED, AND THE TRANSACTION WAS ABORTED. |
| LINK ADDRESS ERROR | 0x09 | (POINT TO POINT) THE VEHICLE IS NOT PRESENT INSIDE THE ZONE. (BROADCAST) THE BROADCAST ADDRESS IS ILLEGAL. |
| DESTINATION PORT ERROR | 0x0A | THE DESTINATION PORT NUMBER IS NOT PRESENT IN THE COUNTERPART. |
| LPP IS NOT SUPPORTED. | 0x0B | THE DSRC-ASL DOES NOT SUPPORT THIS PROTOCOL. |
| ABORTED BY DSRC-ASL | 0x0C | BECAUSE THERE WAS NO SPACE IN THE SEND QUEUE IN THE DSRC-ASL, THE REQUESTED SERVICE WAS ABORTED. |
| TRANSACTION WAS NOT STARTED. | 0x0D | BECAUSE THE NUMBER OF TRANSACTIONS EXCEEDED THE NUMBER WHICH CAN BE EXECUTED AT THE SAME TIME, THE TRANSACTION COULD NOT BE STARTED. |
| UNDER SEGMENTATION/ ASSEMBLY PROCESSING | 0x0E | A TRANSACTION USED SEGMENTATION/RE-ASSEMBLY PROCESSING IS BEING EXECUTED. |
| RESERVED | 0x0F TO 0xFF | RESERVED |

FIG. 39

| PARAMETER \ PRIMITIVE | CONNECT | | | |
|---|---|---|---|---|
| | REQ | IND | RES | CNF |
| QUERIST PORT | M | | | - |
| QUERY LID | O | | | - |
| QUERY PORT | O | | | - |
| TIMEOUT | O | | | - |
| CONNECTED LID | - | | | M |
| ACCEPT PORT | - | | | M |

FIG. 40

| PARAMETER \ PRIMITIVE | DISCONNECT | |
|---|---|---|
| | REQ | IND |
| LINK ADDRESS | - | M |

FIG. 41

| PARAMETER \ PRIMITIVE | ABORT |
|---|---|
| | REQ |
| PORT NO | M |
| BULK AREA | O |
| BULK AREA SIZE | O |

FIG. 42

| PARAMETER \ PRIMITIVE | ABORT |
|---|---|
| | REQ |
| PORT NO | M |

FIG. 43

| PDU TYPE | USAGE SCENARIO |
|---|---|
| INVOKE | USED IN THE PRIMITIVE "INVOKE.REQ". |
| RESULT | USED IN THE PRIMITIVE "INVOKE.RES". |
| ACKNOWLEDGEMENT | USED IN ARRIVAL ACKNOWLEDGEMENT. |
| ABORT | USED WHEN A TRANSACTION IS ABORTED (DUE TO THE PRIMITIVE "ABORT" OR SYSTEM ERROR). |
| INVOKE SEGMENT | USED WHEN THE MESSAGE SIZE EXCEEDS THE MTU IN THE LPCP IN THE PRIMITIVE "INVOKE.REQ". |
| RESULT SEGMENT | USED WHEN THE MESSAGE SIZE EXCEEDS THE MTU IN THE LPCP IN THE PRIMITIVE "INVOKE.RES". |
| NACK | USED IN SELECTIVE RESEND PROCESSING FOR SEGMENTATION/ASSEMBLY PROCESSING. |

FIG. 44

| HEADER PORTION | DATA PORTION |
|---|---|

FIG. 45

| BIT/OCTET | 0 | 1 | 2 | 3 | 4 | 5 | 6 | 7 |
|---|---|---|---|---|---|---|---|---|
| 1 | PDU TYPE=INVOKE (0x01) | | | VERSION | | TT | RA | RD |
| 2 | TID | | | | | | | |
| 3 | | | | | | | | |

FIG. 46

| BIT/OCTET | 0 | 1 | 2 | 3 | 4 | 5 | 6 | 7 |
|---|---|---|---|---|---|---|---|---|
| 1 | PDU TYPE=RESULT (0x02) | | | RES | RES | RES | RA | RD |
| 2 | TID | | | | | | | |
| 3 | | | | | | | | |

FIG. 47

| BIT/OCTET | 0 | 1 | 2 | 3 | 4 | 5 | 6 | 7 |
|---|---|---|---|---|---|---|---|---|
| 1 | PDU TYPE=ACK (0x03) | | | RES | RES | RES | RES | RD |
| 2 | TID | | | | | | | |
| 3 | | | | | | | | |

FIG. 48

| BIT/OCTET | 0 | 1 | 2 | 3 | 4 | 5 | 6 | 7 |
|---|---|---|---|---|---|---|---|---|
| 1 | PDU TYPE=ABORT (0x04) | | | RES | RES | RES | RES | AT |
| 2 | TID | | | | | | | |
| 3 | | | | | | | | |
| 4 | ABORT CODE | | | | | | | |

FIG. 49

| BIT/OCTET | 0 | 1 | 2 | 3 | 4 | 5 | 6 | 7 |
|---|---|---|---|---|---|---|---|---|
| 1 | PDU TYPE=INVOKE SGM (0x05) | | | VERSION | | TT | FIN | RD |
| 2 | TID | | | | | | | |
| 3 | | | | | | | | |
| 4 | SEGMENT NO | | | | | | | |
| 5 | | | | | | | | |

FIG. 50

| BIT/OCTET | 0 | 1 | 2 | 3 | 4 | 5 | 6 | 7 |
|---|---|---|---|---|---|---|---|---|
| 1 | PDU TYPE=RESULT SGM (0x06) | | | RES | RES | RES | FIN | RD |
| 2 | TID | | | | | | | |
| 3 | | | | | | | | |
| 4 | SEGMENT NO | | | | | | | |
| 5 | | | | | | | | |

FIG. 51

| BIT/OCTET | 0 | 1 | 2 | 3 | 4 | 5 | 6 | 7 |
|---|---|---|---|---|---|---|---|---|
| 1 | PDU TYPE=NACK (0x07) | | | RES | RES | RES | RES | RD |
| 2 | TID | | | | | | | |
| 3 | | | | | | | | |
| 4 | NUM SEG=n | | | | | | | |
| 5 | | | | | | | | |
| 6 ... 6+nx2 | SEGMENT NUMBER LIST | | | | | | | |

FIG. 52

| BIT/OCTET | 0 | 1 | 2 | 3 | 4 | 5 | 6 | 7 |
|---|---|---|---|---|---|---|---|---|
| 1 | STATUS=ACCEPT PORT (1) | | | | | | | |
| 2 | NUM PORTS=n | | | | | | | |
| 3 | | | | | | | | |
| 4 ... 4+nx2 | ACCEPT PORT LIST | | | | | | | |

FIG. 53

| BIT/OCTET | 0 | 1 | 2 | 3 | 4 | 5 | 6 | 7 |
|---|---|---|---|---|---|---|---|---|
| 1 | STATUS=REJECT PORT (2) | | | | | | | |
| 2 | REJECT PORT | | | | | | | |

ROADSIDE TO VEHICLE COMMUNICATION SYSTEM

TECHNICAL FIELD

The present invention relates to roadside-to-vehicle communication systems for providing mobile stations with application service, utilizing roadside-to-vehicle communication performed between mobile stations that travel on the roads and base station systems installed on the roadside.

BACKGROUND ART

As an example of conventional roadside-to-vehicle communication systems, the standard "Dedicated Short-Range Communication (DSRC) System Standard ARIB STD-T75", standardized on Sep. 6, 2001, which was established by Association of Radio Industries and Businesses, is known. The standard is to standardize a system for roadside-to-vehicle communications that is performed by means of spot communication whose communication zone is limited, and deals with multiple applications, utilizing an identifier referred to as AID for each application.

However, the foregoing conventional art in which base stations are always masters and mobile stations are always slaves can implement master-slave-type application only, thereby has not been able to be applied to such applications as activating communication or performing even communication between a mobile station and a base station. Moreover, the identifier referred to as AID can define 32 applications only; therefore, there has been a problem in that it is difficult to deal with applications when the kinds of applications increase. Furthermore, the size of data that can be transmit/received at a time is small, for example, about several hundreds of bytes; therefore, it has been difficult to apply the foregoing conventional art to applications that require high-capacity data communication with several tens of kilo bytes.

As an example of approaches to the solution for these problem, by placing Application Sub-layer Extended Link Control Protocol (ASL-ELCP), which is a protocol allowing bidirectional communication, on the foregoing standard (Dedicated Short-Range Communication (DSRC) System Standard ARIB STD-T75), thereby making a base station periodically poll a mobile station about whether there is any communication from the mobile station or not, communication from mobile stations is implemented.

In addition, by defining an identifier referred to as access-point identifier in Application Sub-layer Extended Link Control Protocol (ASL-ELCP), thereby allowing a plurality of protocols to operate on a layer that includes the foregoing standard (Dedicated Short-Range Communication (DSRC) System Standard ARIB STD-T75) and the foregoing Application Sub-layer Extended Link Control Protocol (ASL-ELCP), and by utilizing the Internet Protocol as one of the plurality of protocols, a countermeasure for the multiple applications is implemented. Moreover, by providing segmenting/assembling means referred to as bulk transfer, a message of up to about 50 kilobyte can be transmitted and received. Still moreover, in broadcast communication, by recurrently transmitting the same data multiple times, keeping the error rate of communication low is implemented (e.g., refer to Non-Patent Literature 1).

Non-Patent Literature 1:
The Information Processing Society of Japan, ITS study group, "Implementation and Evaluation of DSRC (ARIB STD-T75) system", 2002-ITS-10-0.

DISCLOSURE OF THE INVENTION

Problems that the Invention is to Solve

However, in the foregoing conventional art, because, in order to implement multi applications, it utilizes Internet protocol, which is a network-type protocol, on the above-mentioned Application Sub-layer Extended Link Control Protocol (ASL-ELCP), there has been a problem in that it is difficult to apply the foregoing conventional art to applications for moving stations, due to issues of overheads related to an initial setup, such as a time for assignment IP addresses or for setting up TCP. Moreover, owing to similar problems, it has still been difficult to apply the foregoing conventional art to applications in which the size of data transmitted from moving station exceeds 100 kilobyte. Still moreover, because the bulk transfer function simply divides data, and the resending of the divided data depends on DSRC, which is a lower layer, there has been a problem in dealing with data that lacks some portions thereof. Furthermore, in areas where communication is not possible for a predetermined period of time, due to shadowing or weak radio waves, all of resent, separate data or continuously sent data may be lost; therefore, there has been a problem in that the error rate can not be improved.

The present invention has been implemented in order to solve such problems as descried above. In a roadside-to-vehicle communication system for providing a mobile station with application service by utilizing roadside-to-vehicle communication implemented between the mobile station that travels and stops on a road and a base station system installed on the road, it is an object of the present invention to provide a non-network-type communication protocol having means for transferring data among a plurality of applications, means for transmitting a great deal of data that exceeds 100 kilobytes, and means that allows the communication error rate to be improved even when communication is not enabled for a certain period of time, in order to enable diverse applications to be implemented even when the mobile station is moving.

Means for Solving the Problems

In a roadside-to-vehicle communication system for providing a mobile station with application service by utilizing roadside-to-vehicle communication implemented between the mobile station that travels on a road and a base station system installed on the road, a roadside-to-vehicle communication system according to the present invention includes a transfer service processing entity for providing means to implement data transfer among a plurality of applications, a transaction management entity that includes undelivered data resending means, data sending/receiving means for each message, and message segmenting/assembling means and that provides unidirectional data transmission and request-response-type transaction services.

ADVANTAGEOUS EFFECTS OF THE INVENTION

A roadside-to-vehicle communication according to the present invention is a system in which local applications of both a base station and a mobile station implement communication by utilizing a non-network-type protocol; because the non-network-type protocol is configured from a transfer service processing entity and a transaction management entity, diverse application can be executed even when the mobile station is moving. Moreover, the communication error rate can be improved even in the case where communication is not possible during a certain period of time.

Still moreover, because the configuration is implemented in such a way that the transfer service processing entity and the transaction management entity are independent, the most simple application is enabled by directly utilizing the transfer service processing entity, whereby conditions, such as high-speed connectability and a low overhead, required by roadside-to-vehicle communication while a vehicle is moving can be met. Furthermore, in extending the protocol, the portion to be extended can be localized within the transaction management entity, whereby the extension of the protocol can readily be implemented.

In the transfer service processing entity, in order to identify both sending and receiving applications, port numbers are utilized. This allows data transfer between a plurality of applications to be achieved. In addition, the number of the port number is 65,536, thereby providing sufficient accommodation for the future increase of the types of applications.

In the transaction management entity, the unit of data sent is identified by means of an identifier (a sent data identifier) designated by an application. Moreover, this protocol has a function to divide the data into segments with transmittable sizes, to send them with a sequential number attached, and to assemble at the receiving side the segments into the original data, based on the sequential numbers, if the unit of data to be sent exceeds the size of data that can be sent at one time by means of a lower-layer protocol. In this situation, in the case of point-to-point communication, when the final data segment is received, the sending station is notified of the sequential number of an undelivered data segment, and then the sending station resends the undelivered data segment only. This improves the communication error rate.

In addition, in the case of point-to-point communication and broadcast communication, when the application identifier of a sending source (sending source port number) and the sent data identifier designated by the application are the same, the receiving side handles the sent data as being identical to the data that has been received by the receiving side and that has the same identifier. Accordingly, the sending side can resend data at arbitrary timing, whereby the communication error rate can be improved even when communication is not enabled for a certain period of time.

BRIEF DESCRIPTION OF DRAWINGS

FIG. 2 is a table denoting local port number classification;
FIG. 4 is a table denoting primitive types;
FIG. 5 is a table denoting parameter types;
FIG. 6 is a diagram illustrating logical relationship of data transfer service;
FIG. 9 is a table denoting an event notification primitive definition;
FIG. 10 is a table denoting a port generation primitive definition;
FIG. 11 is a table denoting a port abort primitive definition;
FIG. 12 is a table denoting a configuration example of an accept port list;
FIG. 13 is a table denoting a configuration example of communication control information;
FIG. 14 is a table denoting data transfer message types;
FIG. 15 is a table denoting protocol identifiers of LPCP;
FIG. 16 is a table denoting event notification message types;
FIG. 17 is a table denoting contents of the event code (Event Code);
FIG. 34 is a table denoting primitive types;
FIG. 35 is a table denoting parameter types;
FIG. 36 is a table denoting Invoke primitive parameters;
FIG. 37 is a table denoting Abort primitive parameters;
FIG. 38 is a table denoting an Abort code list in the case where Abort Type 0 (system error);
FIG. 39 is a table denoting Connect primitive parameters;
FIG. 40 is a table denoting Disconnect primitive parameters;
FIG. 41 is a table denoting Register Port primitive parameters;
FIG. 42 is a table denoting Register Port primitive parameters;
FIG. 43 is a table denoting a PDU type list;
FIG. 44 is a diagram illustrating the basic structure of protocol data unit of LPP;
FIG. 45 is a table denoting the header information of Invoke PDU;
FIG. 46 is a table denoting the header information of Result PDU;
FIG. 47 is a table denoting the header information of Acknowledgement PDU;
FIG. 48 is a table denoting the header information of Abort PDU;
FIG. 49 is a table denoting the header information of Invoke Segment PDU;

FIG. 50 is a table denoting the header information of Result Segment PDU;

FIG. 51 is a table denoting the header information of Result PDU;

FIG. 52 is a table denoting protocol data units in the case of accept port list notification;

FIG. 53 is a table denoting protocol data units in the case of reject port notification;

BEST MODE FOR CARRYING OUT THE INVENTION

Embodiment 1

Figure 1:
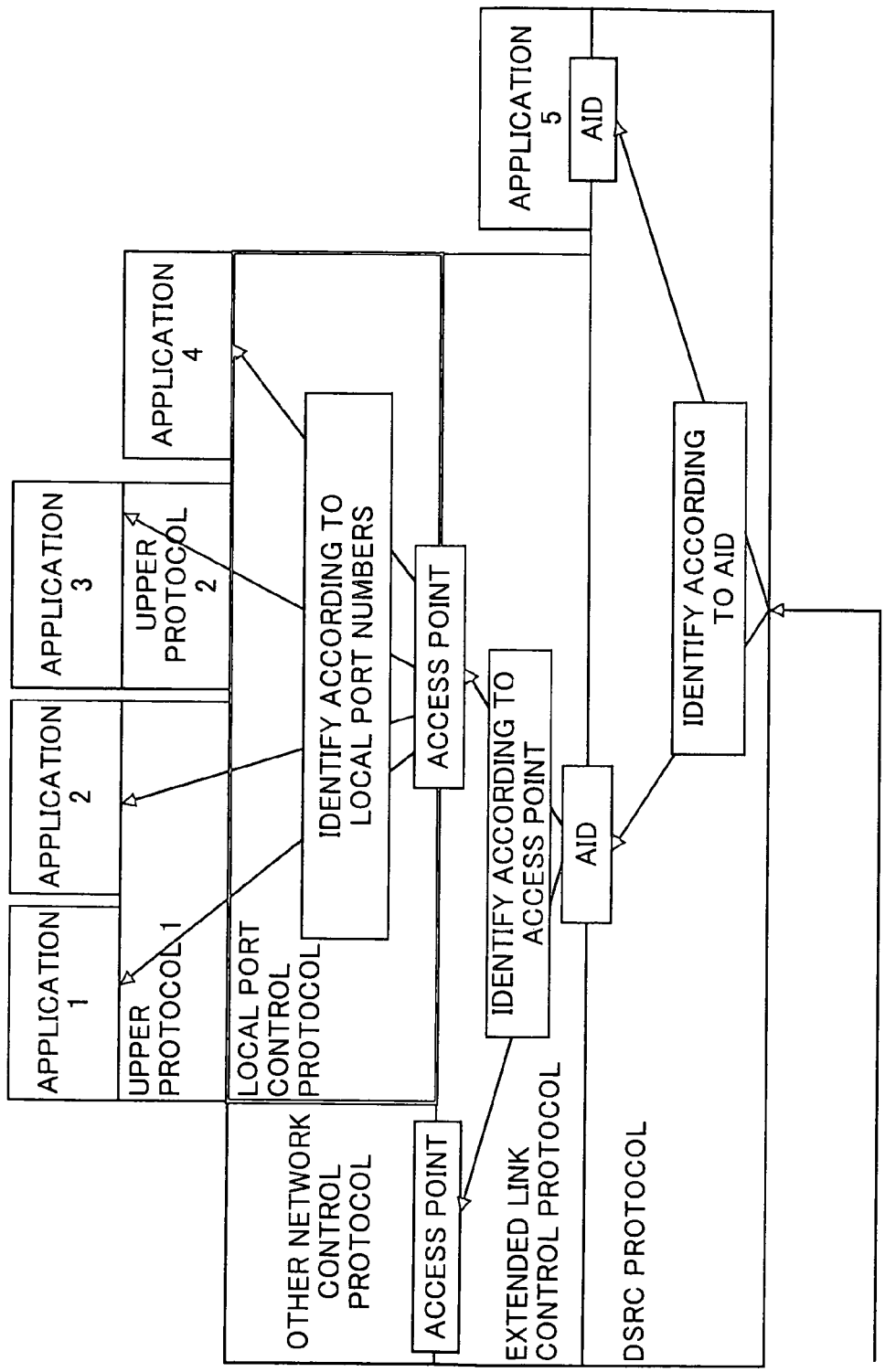
FIG. 1 is a diagram illustrating a connection-identifying concept in a roadside-to-vehicle communication system according to Embodiment 1 of the present invention.
Figure 3:
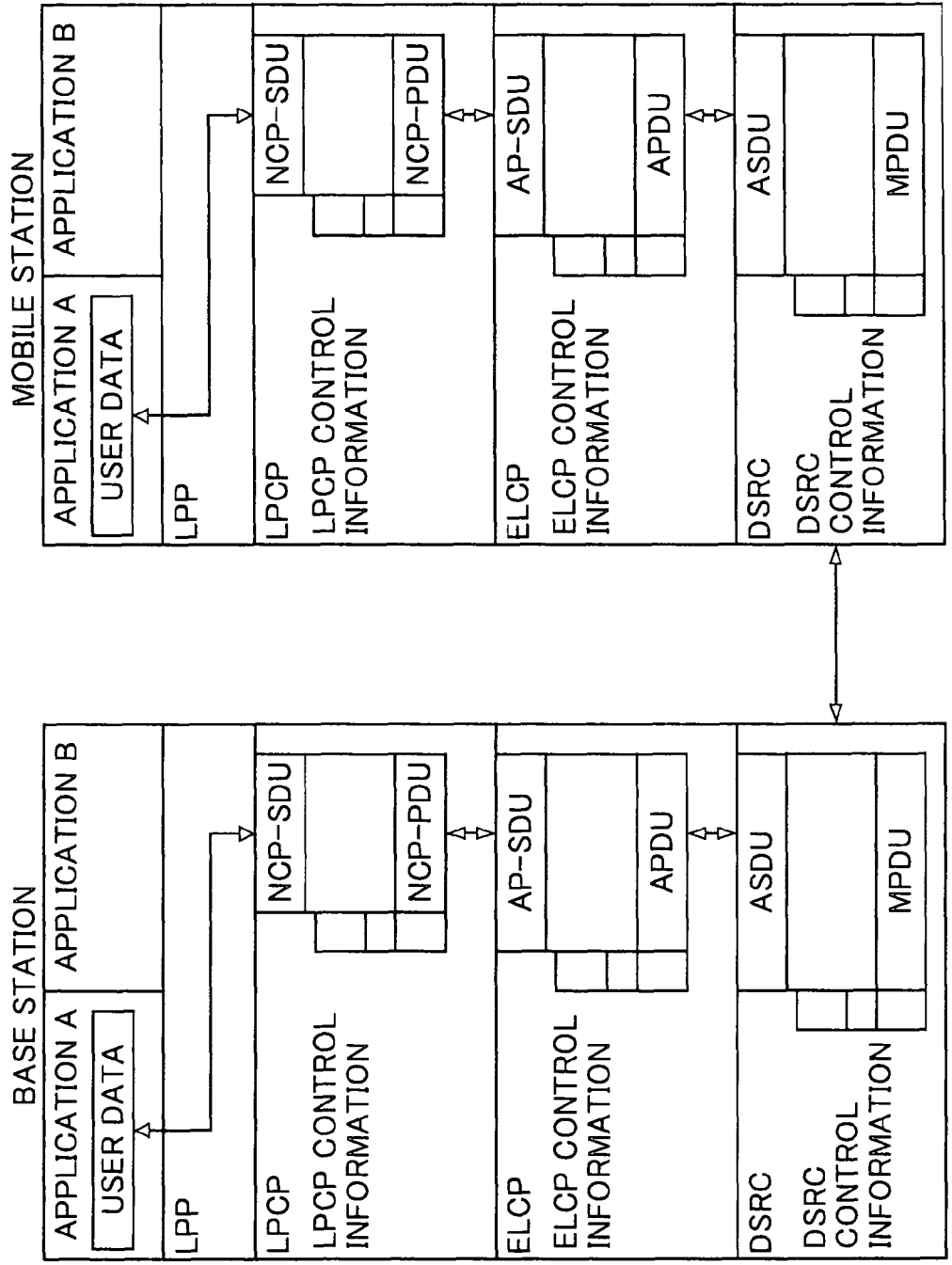
FIG. 3 is a diagram illustrating an example of datagram transfer service.

FIG. 1 is a diagram illustrating a connection-identifying concept in a roadside-to-vehicle communication system according to Embodiment 1 of the present invention. In addition, FIG. 3 is a diagram illustrating an outline of the data flow in a roadside-to-vehicle communication system according to Embodiment 1 of the present invention. The basic structures of a base station system and a mobile station will be discussed referring to FIGS. 1 and 3.

Communication protocols utilized in the base station system and the mobile station are in a layer structure including the dedicated short range communication (DSRC) protocol (ARIB STD-T75), the application sub-layer extended link control protocol, which is a protocol enabling bidirectional communication (ASL-ELCP), a transfer service processing entity (the local port control protocol (LPCP: Local Port Control Protocol)), and a transaction management entity (the local port protocol (LPP: Local Port Protocol)); a plurality of applications are implemented on the communication protocols.

The transfer service processing entity is a control protocol for realizing concurrent applications on the dedicated short range communication (DSRC) protocol (ARIB STD-T75) and the application sub-layer extended link control protocol (ASL-ELCP) and has a minimal function for realizing multiple applications.

Meanwhile, the transaction management entity is a communication protocol that intervenes between the transfer service processing entity and the applications and that extends communication services of the transfer service processing entity, and provides the applications with higher-level communication services such as high-capacity data communication.

The transfer service processing entity and the transaction management entity will be discussed in detail below.

1. Transfer Service Processing Entity (Local Port Control Protocol)

1.1 Summary

The transfer service processing entity (Local Port Control Protocol) will be discussed in detail below. The local port control protocol (LPCP) is a control protocol for providing upper protocols, such as applications, with a data transfer service for transferring data and a management service for management and control, in order to provide non-network-type applications with communication means.

The respective transfer service processing entities identify applications of the sending source and the receiver by utilizing identifiers referred to as local port numbers. In addition, the transfer service processing entity provides applications in the upper layer and upper-layer protocols, such as the transaction management entity, with service primitives (interfaces) for transferring data and for the management service. Moreover, the transfer service processing entity has control information, as internal data, for realizing the data transfer service and the management service, and realizes various kinds of services, by adding the control information to data (PDU) that is exchanged between the transfer service processing entities in the vehicle and road side unit.

1.2 Local Port Number 1.2.1 Access-Point Identification

In order to correctly deliver data from an application that is a sender to an opposite application, in the local port control protocol (LPCP), as illustrated in FIG. 1, local port numbers are provided as access points for identifying applications on LPCP, thereby identifying the connection, of each application, with the opposite party, by means of the combination of a vehicle ID (link address or the like) and the local port number.

1.2 Local Port Number Classification

FIG. 2 is a table denoting local port number classification. Local port numbers are used as the connection identifiers in non-network-type applications; the local port numbers are specified as below. "0" to "0x0FFF" are number reservation ports, and "0x1000" to "0xFFFF" are private port numbers. Specifying the port numbers as such allows 65,536 types of port numbers to be specified, thereby providing sufficient accommodation for the future increase of the types of applications.

1.2.3 Relationship Between Applications and Local Port Numbers

The relationship between applications and the local port numbers specified in the preceding paragraph will be described.

The application modes are on the basis of a client/server model and a peer-to-peer model. Therefore, it is fundamental that, in the client/server model, the number reservation ports are used for server process ports that are globally unique, and that the private local port numbers are used for client process ports that are unique within the station. In addition, it is fundamental that, in the peer-to-peer model, both processes utilize the number reservation ports. In the case of proprietary applications, both the server and the clients may use private ports.

1.2.4 Setting of Local Port Numbers

The local port numbers are set in accordance with the following rules.
(1) With regard to the reservation numbers, numbers that do not globally overlap each other shall be assigned.
(2) An application can have a plurality of receiving ports.
(3) Each base station or each mobile station is regarded as a unit, and each application shall use receiving port numbers which do not overlap each other within each station.
(4) When identification of the sending source is unnecessary or when the sending source is known, the sending source port can be omitted.

1.3 Function of LPCP

Next, functions of LPCP will be described.

1.3.1 Datagram Transfer Service

FIG. 3 is a diagram illustrating an example of datagram transfer services; The configuration for local port system applications is a hierarchy structure in which a plurality of applications is on LPCP; LPCP needs to identify the application of a transfer destination to which data is transferred.

Therefore, by adding sending-source and destination-port numbers to LPCP, transfer destinations are determined.

In addition, the communication service that LPCP provides is a high-speed, low-overhead, and connection-less-type datagram transfer service; the specific operation implemented between LPCP and an application (upper-layer protocol) is as follows:
1. The application (upper-layer protocol) requests LPCP to newly create a receiving port that receives data;
2. Through the receiving port, the application receives from LPCP the vehicle ID (link address or the like), the sending source port number, and data to be received.

On the other hand,
3. The application (upper-layer protocol) passes transmission data, the link address, and sending and receiving port numbers to LPCP, and LPCP then forms LPCP datagram, utilizing the information, and send them to the opposite party.

1.3.2 Management Service

In a management service processing, applications and upper protocols are provided with the following services:
A service in which errors or events (notification of connection being connected or being not connected, or the like) notified by the management service of ASL-ELCP (Application Sub-layer Extended Link Control Protocol) are transparently notified to the applications of the LPCP's own station; and
A service in which errors or events produced within LPCP are notified to the opposite station and the applications of the LPCP's own station.

The specific operation implemented between LPCP and applications (or upper-layer protocols) is as follows:
1. The application (or upper-layer protocol) requests LPCP to newly create a port that receives events; and
2. Through the port, the application receives from LPCP a link address, a status identifier, and additional event information.

1.4 Interface with Application

Next, the interface between LPCP and an application will be described.

1.4.1 Explanation for Notation

FIG. 4 shows the list of primitive types specified in the present invention, and FIG. 5 shows the list of parameter types used in the primitive definition table.

1.4.2 Data Transfer Service Interface

FIG. 6 shows a logical relationship of the data transfer service.

The Local Port Control Protocol provides an application (or upper-layer protocol) with the following one kind of primitive as the data transfer service.

1.4.2.1 Transfer Primitive (Transfer Data)

Figures 7, 8:
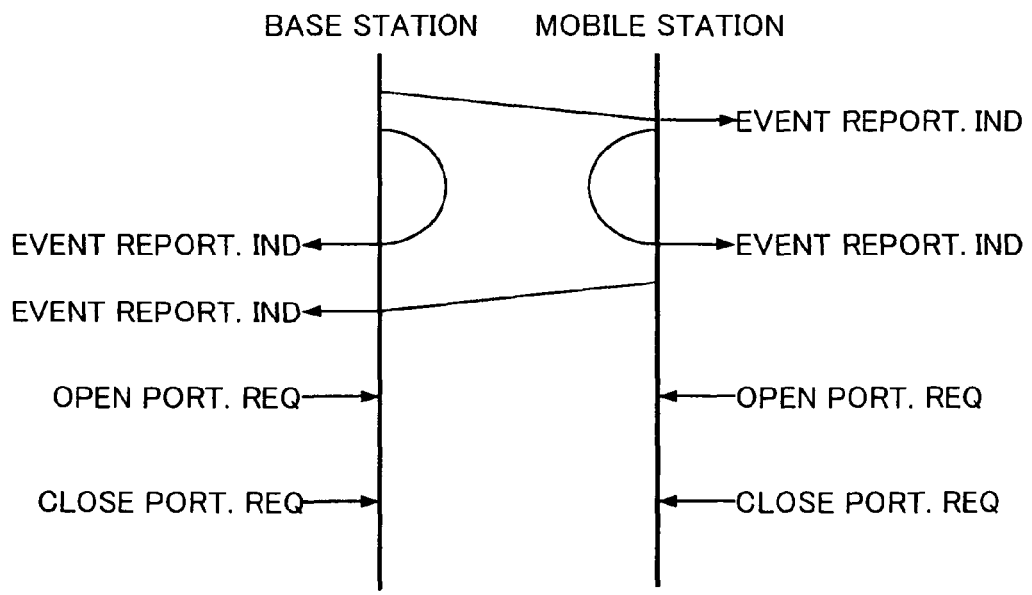
FIG. 7 is a table denoting a transfer primitive definition.
FIG. 8 is a diagram illustrating logical relationship of management service interface.

This primitive is to implement data transfer between ELCP of DSRC-ASL and a non-IP application or an upper-layer protocol. FIG. 7 shows a transfer primitive definition. In FIG. 7, "Link Address" is a LID of the DSRC, which is utilized in proper transmission, or an ID that can be mapped on one-to-one with a LID;

"Source Port" is the port number of a sending-source application.

"Destination Port" is the port number of a destination application;

"User Data" is a transmitted-data body; and

"User Data Size" is the size of transmitted data

1.4.3 Management Service Interface

FIG. 8 shows a logical relationship of the management service interface. The Local Port Control Protocol provides an application (or upper-layer protocol) with the following one kind of primitive as the data transfer service.
 Event Report (Event Notification Primitive)
 Open Port (Port Generation Primitive)
 Close Port (Port Abort Primitive)

1.4.3.1 Event Notification Primitive (Event Report)

This primitive is to report the occurrence of events and errors to non-IP applications and upper-layer protocols. This primitive includes two kinds, i.e., the one is to transparently transfer events notified by the management service of ASL-ELCP to the Local Port Protocol, and the other one is to transparently transfer notification from the management service of the opposite station. FIG. 9 shows the definition of the event notification primitive. In FIG. 9, Link Address: to designate LID that is used by a notification receiver, or that is being used by the notification receiver.

Event Code: to store the status identifiers (FIG. 17) as the event codes.

Extension Parameter: the additional event information corresponding to each event code.

1.4.3.2 Port Generation Primitive (Open Port)

This primitive is to generate for LPCP the receiving ports for data and events. FIG. 10 shows the definition of the port generation primitive. In FIG. 10, Port: the port number that requests notification.

Type: designation of the primitive type that needs to be notified.
 1. Transfer Data
 2. Event Report When this parameter is omitted, notification for all primitives is requested.

Code: the event types that need to be notified when Type 2 (Event Report)

When this parameter is omitted, notification for all primitives is requested.

As for details for the event types, refer to FIG. 17.

1.4.3.3 Port Abort Primitive (Close Port)

This primitive is to abort the receiving port created by the port generation primitive.

FIG. 11 shows a table denoting the definition of the port abort primitive. In FIG. 11, Port: the port number to be aborted.

1.5 Control Information 1.1 Summary

Next, the control information, of LPCP, to be used in the management service will be described.

In the management service, the communication parameter to be used in LPCP is managed.

In the management service of LPCP, the following information is managed:

(1) Accept Port List (2) Communication Control Information.

1.5.2.1 Accept Port List

This list provides the information of port numbers that can be received by the base station and the mobile station; the information is added to the list when the receiving port generation primitive is received, and is deleted from the list when the receiving port abort primitive is received.

FIG. 12 shows a configuration example of the accept port list.

1.5.2.2 Communication Control Information

This is the information of the applications being communicated between the base station and the mobile station; the information is added to the list when the DSRC connection notification from the management service is received, and is deleted from the list when the DSRC disconnection notification is received.

FIG. 13 shows a configuration example of the accept port list.

DESCRIPTION FOR ABBREVIATION

LID: Link Address
Port No: Accept Port Number
Primitive Type: Type of Primitive to be Received
Event Code: Type Of Event Code to be Received
Equipment ID: Inherent Information of In-Vehicle System 1.6 Protocol Data Unit (PDU)

Next, the LPCP Protocol Data Unit (PDU) that is used in the datagram transfer service and the management service will be described.

The PDU of the LPCP is configured from the Local Port Control Protocol header and the application data portion.

1.6.1 Protocol Data Unit of Datagram Transfer Service

FIG. 14 shows the LPCP PDU types to be used in the datagram transfer service.

Access-Point Identifier: This identifier is to identify the Network Control Protocol, and always stores the Local Port Control (1).

Protocol Identifier: This identifier denotes the PDU types, and stores message (0) during the datagram transfer service. For details, refer to FIG. 15.

Sending Source Port Number: Port Number of Sending Source Application

Destination Port Number: Port Number of Destination Application

Length of User Data portion: This is to indicate the data length of the following user data portion. Units of the data length are octet. In addition, the size of this field expands in accordance with the ASN. 1 coding rule. If no user data follows (in the case of null), "0" is set in this field. The LPCP MTU (Maximum Transmission Unit) that is the maximum length of data which can be passed from the LPCP to the ASL-ELCP shall be 522 octets (including the access control information).

Contents of User Data Portion: This field is the main body of the transfer data, and stores OCTET-STRING-type, undefined-length data.

FIG. 15 is a table denoting the protocol identifiers of the LPCP.

1.6.2 Protocol Data Unit of Management Service

FIG. 16 shows the LPCP PDU types to be used in the management service. The PDUs described below are used when events are notified to the LPCP of the opposite station.

FIG. 16 is a table denoting the event notification message format.

Access-Point Identifier: This identifier is to identify the Network Control Protocol, and always stores the Local port control (1).

Protocol Identifier: This identifier denotes the PDU types, and, in the management service, always stores the Event report (1). Event Code: Identifier For Indicating Created Event Contents "0" to "127" are the status identifiers of the extended link control protocol, and "128" to "255" are the status identifiers of the LPCP. FIG. 17 is a table denoting the contents of the event code (event Code).

Length of Additional Event Information: This is to indicate the data length of the following additional event information "Octet" is used as the unit. In addition, the size of this field expands in accordance with the ASN. 1 coding rule. If no event information follows (in the case of null), "0" is set in this field.

Contents of Additional Event Information: This is to indicate the contents of the additional event information, and stores OCTET-STRING-type, undefined-length data.

1.7 Processing Procedure

The processing procedure in the LPCP will be described.

1.7.1 Initial Setup Procedure (a) An application previously issues the DSRC connection notification request to the LPCP by means of the port generation primitive.

(b) When a vehicle enters the DSRC service area, the status "communication connection notification" is received by means of the management-service event notification primitive (Event Information. Ind) of the ASL-ELCP.

(c) The event code "DSRC connection notification (96)" is notified by means of the event notification primitive (Event Report. ind) to the port that has requested the DSRC connection notification by means of the port generation primitive.

Figure 18:
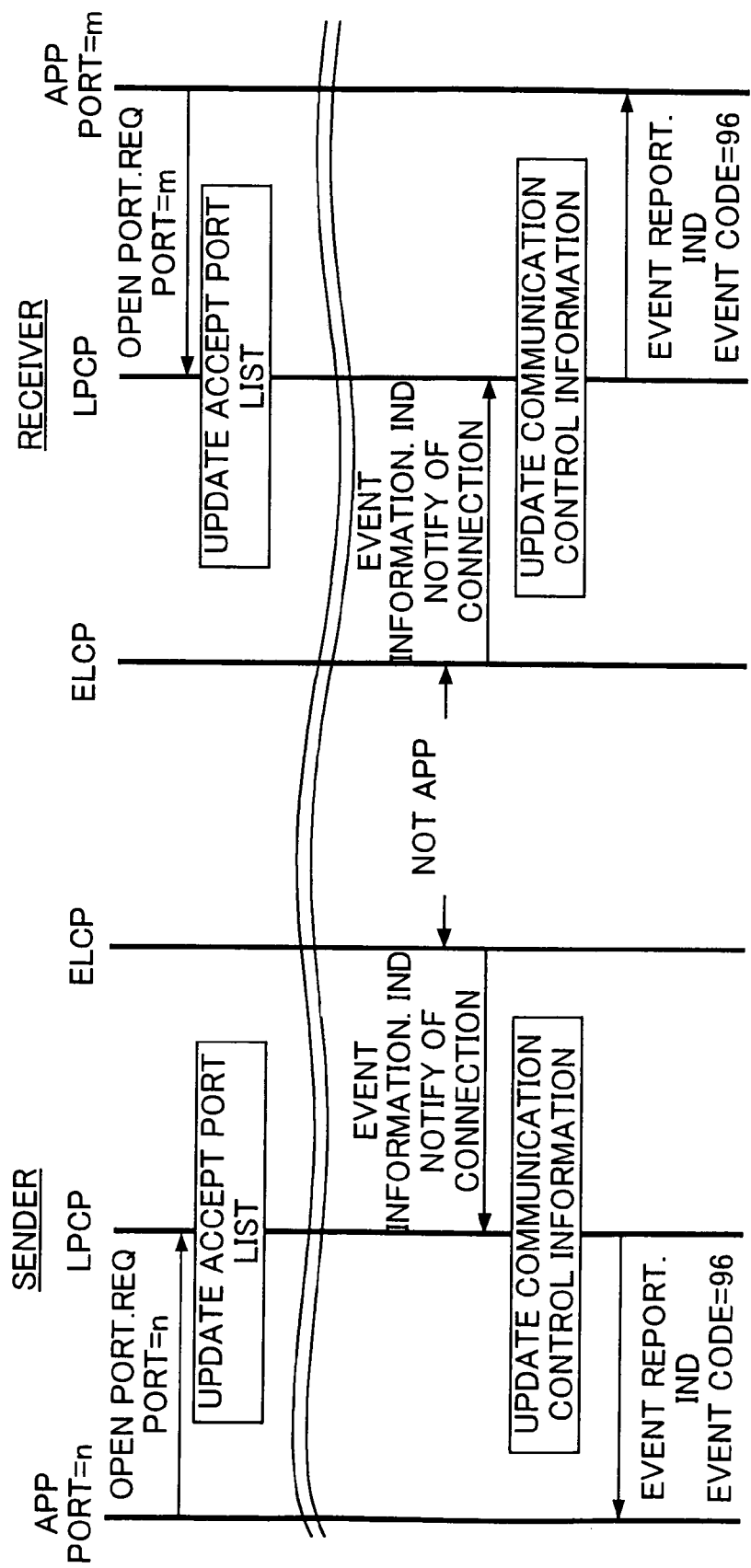
FIG. 18 is a diagram illustrating an example of initial setup procedures.

FIG. 18 illustrates an example of processing sequence in the case of the DSRC connection.

1.7.2 Communication Ending Procedure (a) An application previously issues the DSRC disconnection notification request to the LPCP by means of the port generation primitive.

(b) The status "communication disconnection notification" is received by means of the management-service event notification primitive (Event Information. Ind) of the ASL-ELCP.

(c) The event code "DSRC disconnection notification" is notified by means of the event notification primitive (Event Report.ind) to the connection management service of the LPP.

Figure 19:
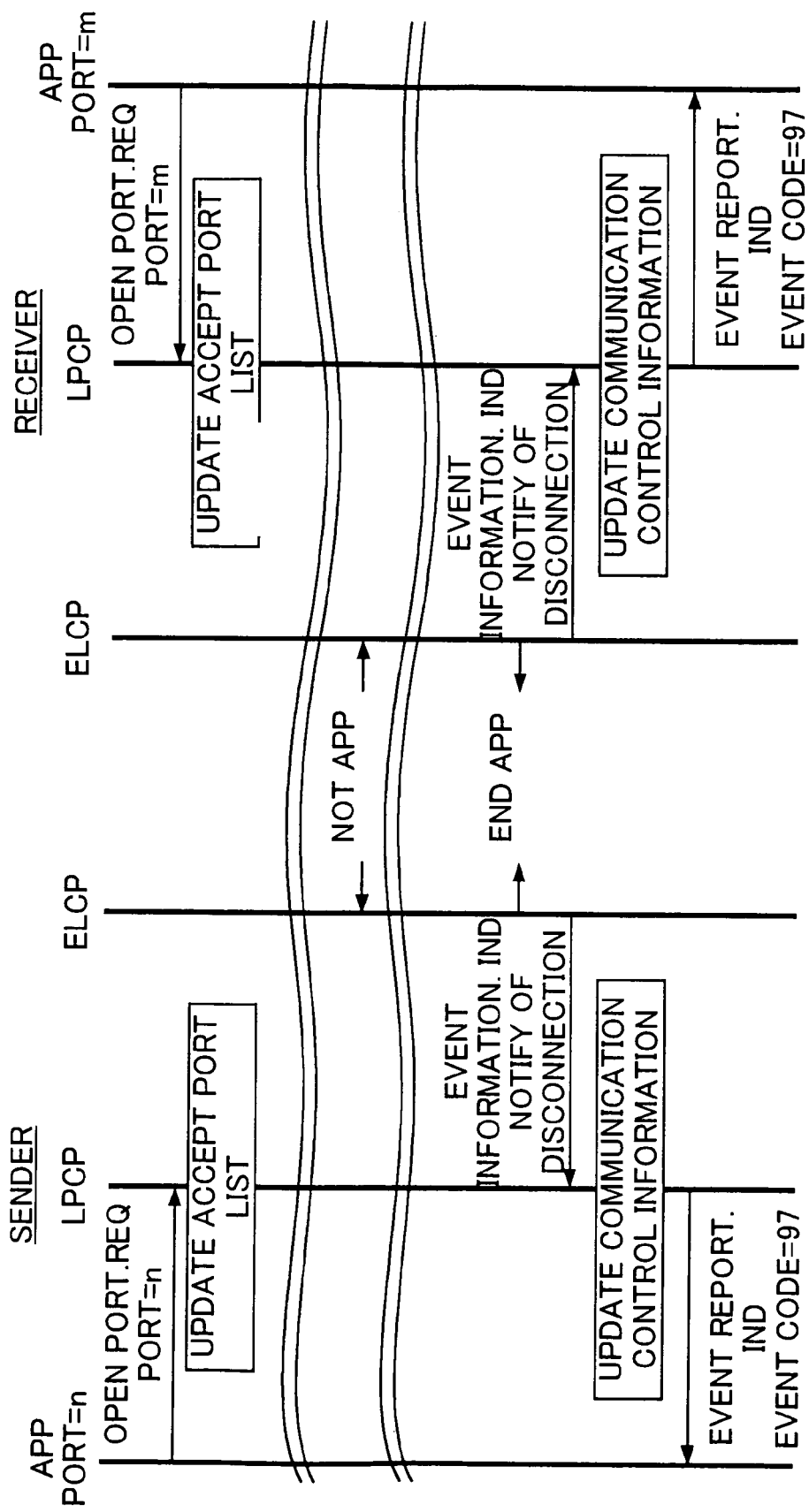
FIG. 19 is a diagram illustrating an example of communication ending procedures.

FIG. 19 illustrates an example of processing sequence in the case of ending the communication.

1.7.3 Message Transfer Procedure (1) Transmission Processing (a) The data transfer request primitive (Transfer Data.req) is issued.

(b) By referring to the communication control information, when the designated Link Address is a private link address, and the DSRC is not connected through the link address, the status identifier issues the event notification primitive "DSRC is not connected (128)" to the sending source port number that has been designated by means of the data transfer request primitive; the transmission processing is then completed. In this regard, however, this procedure is implemented merely when the event notification has been requested by means of the local port generation primitive; when the event notification has not been requested, the event notification to an upper protocol is not implemented. Whether there is the event notification or not is determined by means of the accept local port list.

(c) When the DSRC is connected, a packet having an access-point identifier of the Local Port Control Protocol (1) and a protocol identifier of message (0) is created and transmitted by means of the data transfer primitive (Send Unit Data.req) of the ASL-ELCP, whereupon the transmission processing is completed.

(d) After completion of the transmission processing, when an event notification message from the opposite station to which the data transfer message has been transmitted is received, the event code passed by means of the message is identified; when the contents of the event code is "the destination local port is not enabled", the sending source local port number that has been designated by the additional event information of the message is notified of "the destination local port is not enabled" by means of the event notification primitive (Event report.ind). In this regard, however, this procedure is implemented merely when the event notification has been requested by means of the port generation primitive; when the event notification has not been requested, the event notification to an upper protocol is not implemented. Whether there is the event notification or not is determined by means of the accept local port list.

(2) Receiving Processing (a) An application issues the transfer notification request to the LPCP by means of the port generation primitive.

(b) When a packet having the protocol identifier of message (0) is received from the ASL-ELCP by means of the data transfer notification primitive (Send Unit Data.ind), the protocol identifier, the destination local port number, the sending source local port number, and the user data are extracted.

(c) By referring to the accept port list, when the destination port number received in (b) is enabled, the upper entity that has been designated by the destination port number is notified of reception of data from the opposite station by means of the data transfer primitive (Transfer Data. ind); the receiving processing is then completed.

(d) When the link address is a private address, and the destination port number received in (b) is not enabled, a packet having the protocol identifier of event Report (1) and the status identifier of "the destination port number is not enabled (129)" is created and is transmitted to the opposite station by means of the data transfer primitive of the ASL-ELCP; the receiving processing is then completed. In other words, when a message from the opposite station is received and when no destination application exists in the own station, the fact is immediately notified to the opposite station. In addition, when the link address is a group broadcast address, and the destination port number received in (b) is not enabled, the data received is aborted, whereupon the receiving processing is completed.

Figure 20:
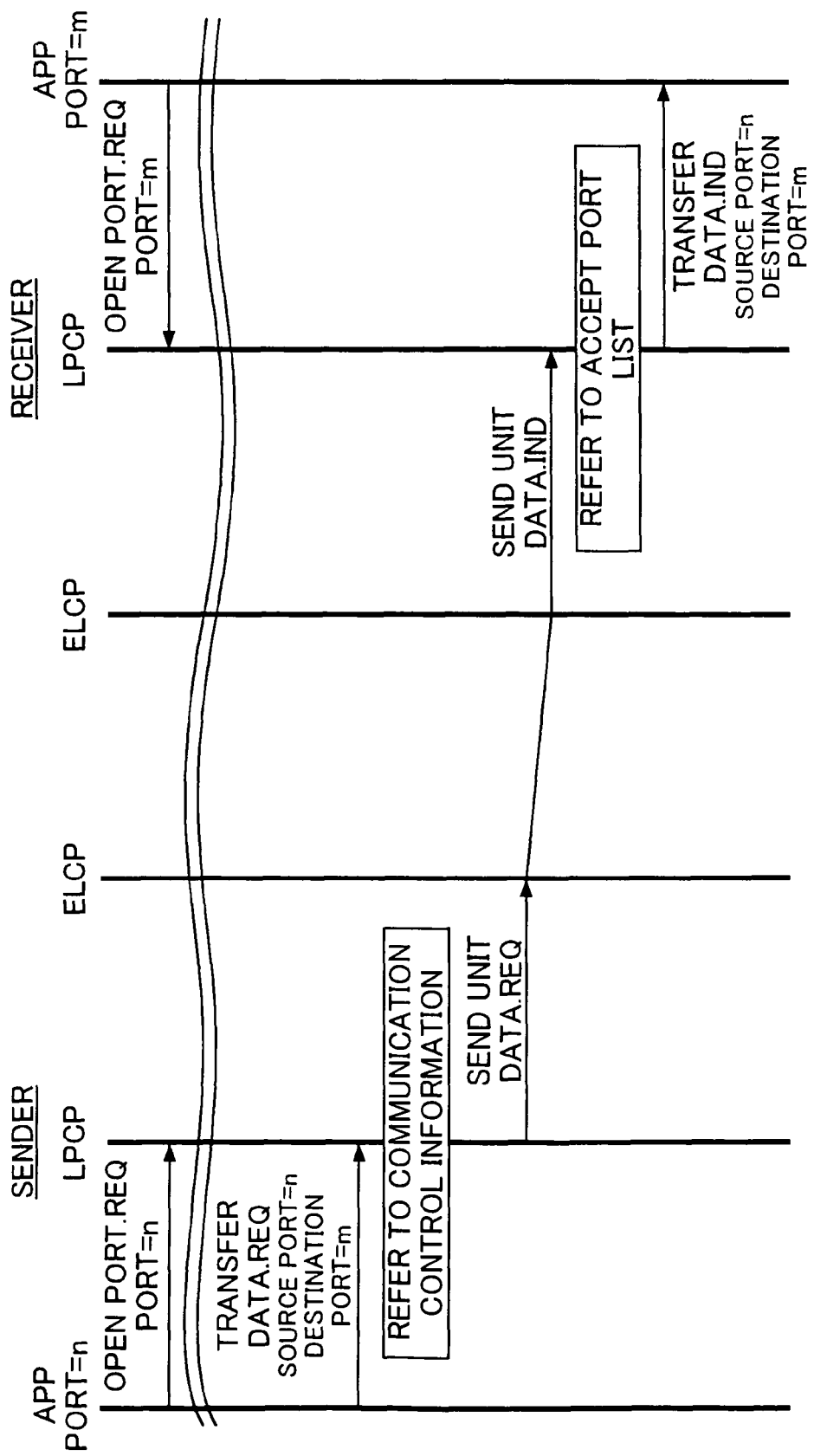
FIG. 20 is a diagram illustrating the message transfer procedure of LPCP.
Figure 21:
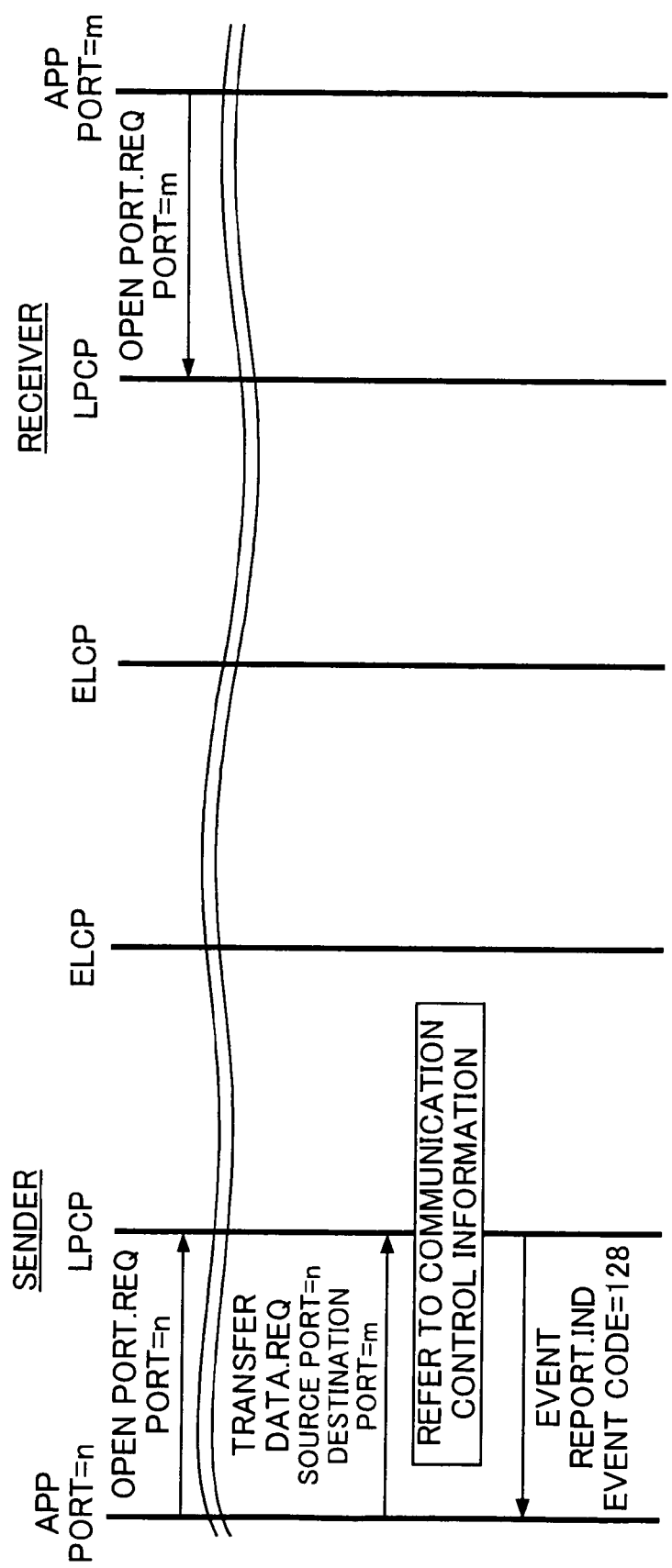
FIG. 21 is a diagram illustrating a processing procedure in the case where DSRC is not connected.
Figure 22:
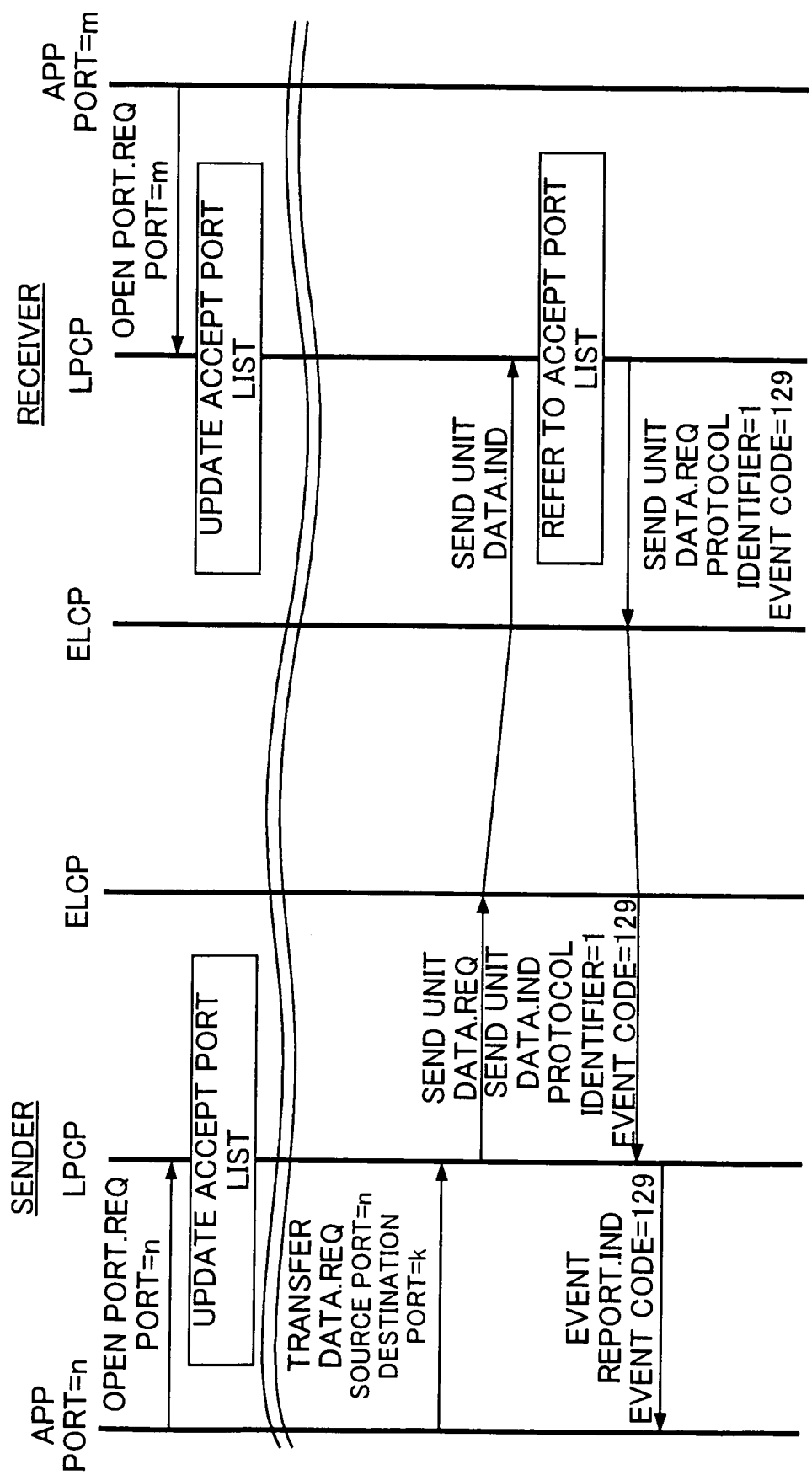
FIG. 22 is a diagram illustrating a message transfer procedure in the case where the destination port number is not enabled.

FIG. 20 illustrates an example of the basic processing sequence for transferring a message; FIG. 21, the processing sequence in the case where the DSRC is not connected; and FIG. 22, the processing sequence in the case where the destination local port number is not enabled.

2. Transaction Management Entity (Local Port Protocol)

The transaction management entity (Local Port Protocol) will be described below in detail.

2.1 Summary

Figure 23:
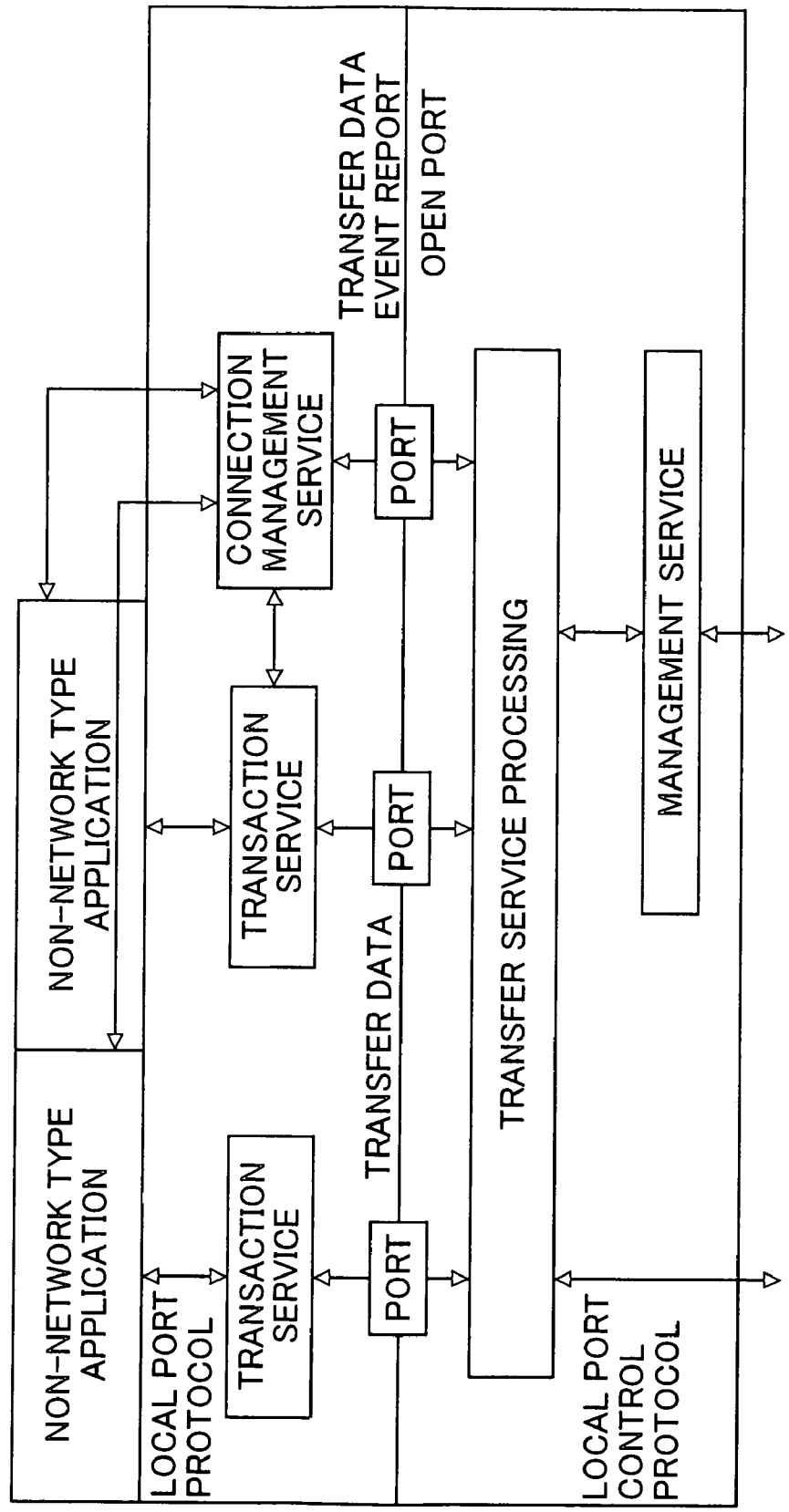
FIG. 23 is a diagram illustrating the concept of LPP.

The local port protocol (LPP: Local Port Protocol) is a transaction-oriented protocol that intervenes between the Local Port Control Protocol (LPCP) and non-network-type applications and that has an object to enhance the efficiency in configuring applications, by extending the function of the Local Port Control Protocol and by providing the non-network-type applications between the DSRC in-vehicle system and the roadside system with the following transaction services and the connection management services (refer to FIG. 23). This protocol includes transaction service processing entity that extends the communication functions of the Local Port Control Protocol, and the connection management service processing entity that manages the communication status such as initial setup and disconnection. Each service processing entity has the following functions.

Transaction Service Processing Entity
Data Exchange Functions per Transaction
Unidirectional Data-Sending Transaction Service
Request-Response Type Transaction Service
Data-Resending Function
Message Segmentation/Re-Assembly Function
Transaction Abortion Function
Connection Management Service Processing Entity
DSRC Connection Query Service
DSRC Disconnection Notification Service
Accept Port Query Service Moreover, the transaction management entity provides the applications with service primitives (interface with the applications) for utilizing the foregoing functions. Furthermore, in order to realize the foregoing functions, the transaction management entity defines the structure of data (PDU) that is exchanged between the transaction management entities of the vehicle and road side unit. As for the transaction management entities, the sending-source transaction management entity adds control information corresponding to a function requested by means of the service primitive (or an event generated within the transaction management entity), and the receiving-side transaction management entity analyzes and utilizes the control information added to the PDU, whereby the foregoing functions are realized.

2.2 Function of LPP

Next, the functions of each service processing entity in the LPP will be described in detail.

2.2.1 Transaction Service Processing

2.2.1.1 Data Exchange Function Per Transaction

In the LPP, application data is exchanged transaction by transaction.

Figure 24:
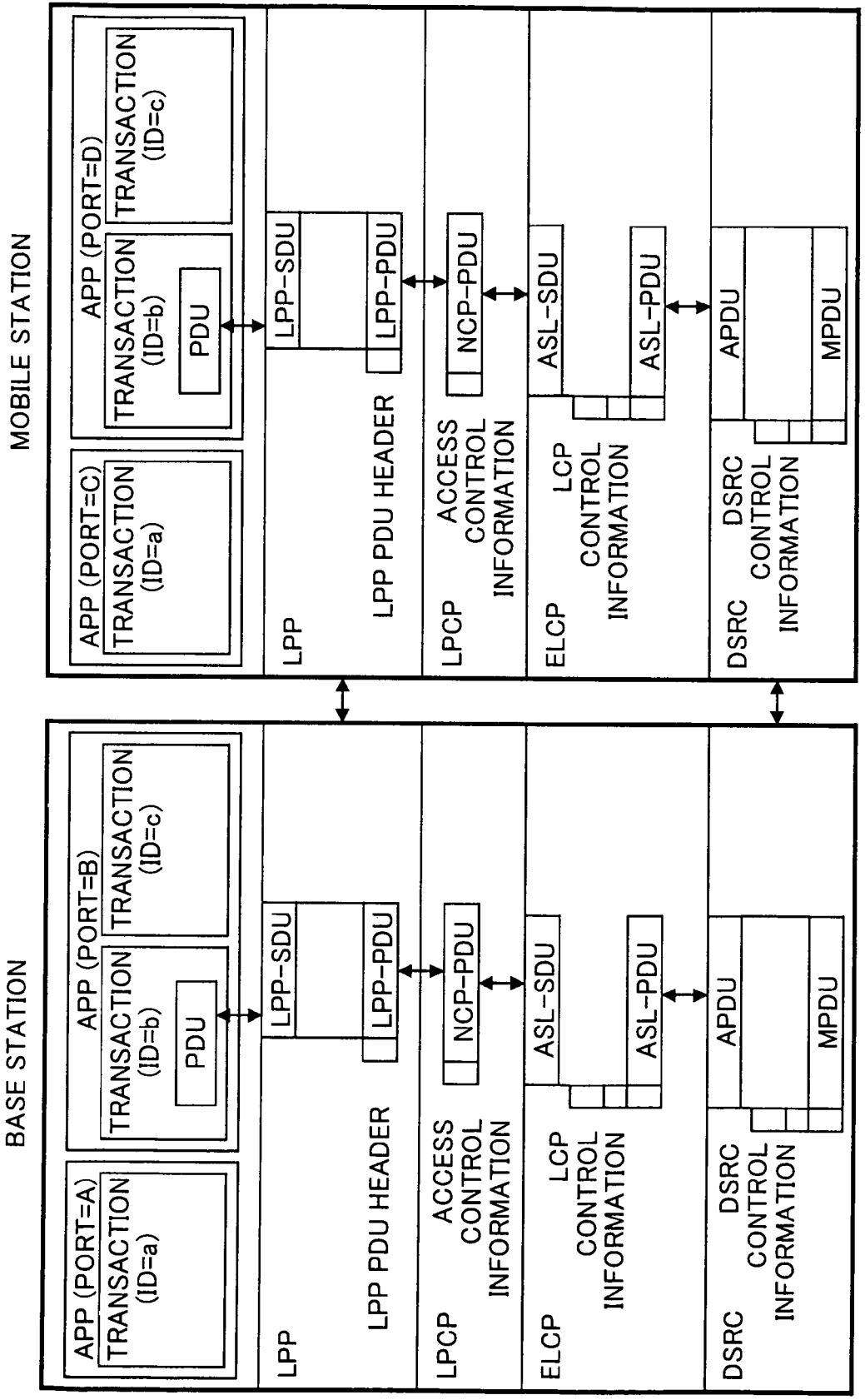
FIG. 24 is a diagram illustrating an example of data exchange between transactions in LPP.

Each transaction is identified by means of a transaction ID (refer to FIG. 24). This way allows accommodation to the case where a plurality of transactions concurrently exists between the same pair of applications.

FIG. 24 is a diagram illustrating an example of data exchange between transactions in LPP.

In addition, the transaction IDs are numbered as follows:
(1) The ID consists of 16 bits.
(2) The first bit indicates the transaction starting side. ("0" indicates a mobile station, and "1" indicates the roadside station).
(3) Every time a new transaction is created, the ID is incremented by "1".

2.2.1.2 Two-Type Transaction Service Providing Function

The LPP provides the following two types of transaction services:
  Unidirectional Data-Sending Transaction Service
  Request-Response Type Transaction Service The transaction service having the level corresponding to the communication requirements for each application is utilized, whereby the optimum communication service is available for each application.

2.2.1.2.1 Basic Transaction (1) Data-Sending Service

Figure 25:
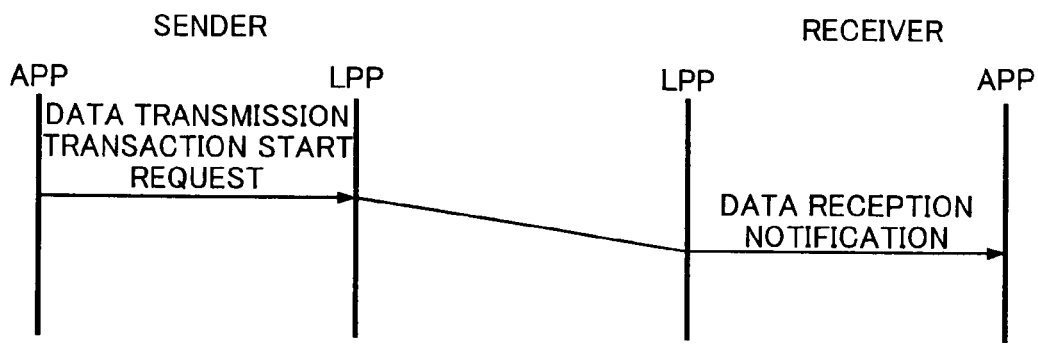
FIG. 25 is a diagram illustrating an example of a data transfer service.

The LPP provides data-sending service to non-network-type applications in both the base and mobile stations (refer to FIG. 25).

FIG. 25 is a diagram illustrating an example of the data-sending services.

(2) Request-Response-Type Transaction Service

The LPP notifies its counterpart of a message, and acquires the returned value for the message. This service can be used, for example, for method calling to a remote station.

Figure 26:
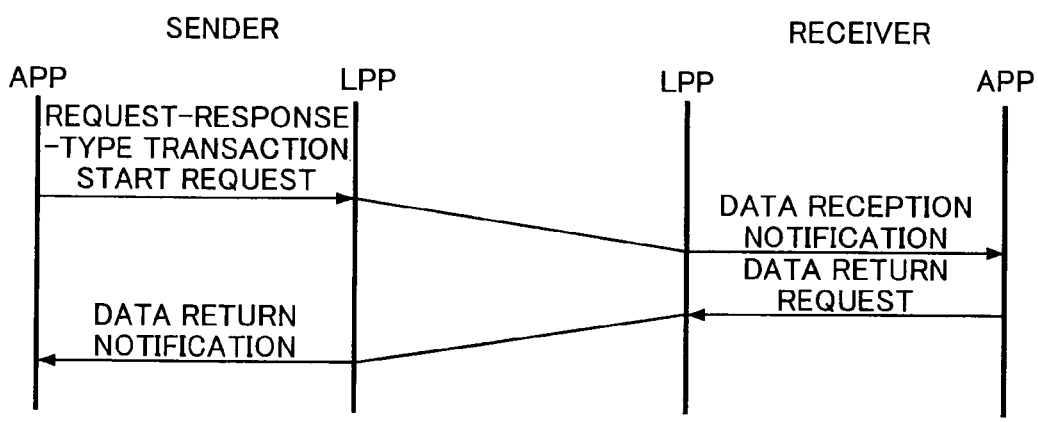
FIG. 26 is a diagram illustrating an example of a request-response-type transaction service.

FIG. 26 is a diagram illustrating an example of the request-response-type transaction services;

2.2.1.2.2 Data-Resending Function

Figure 27:
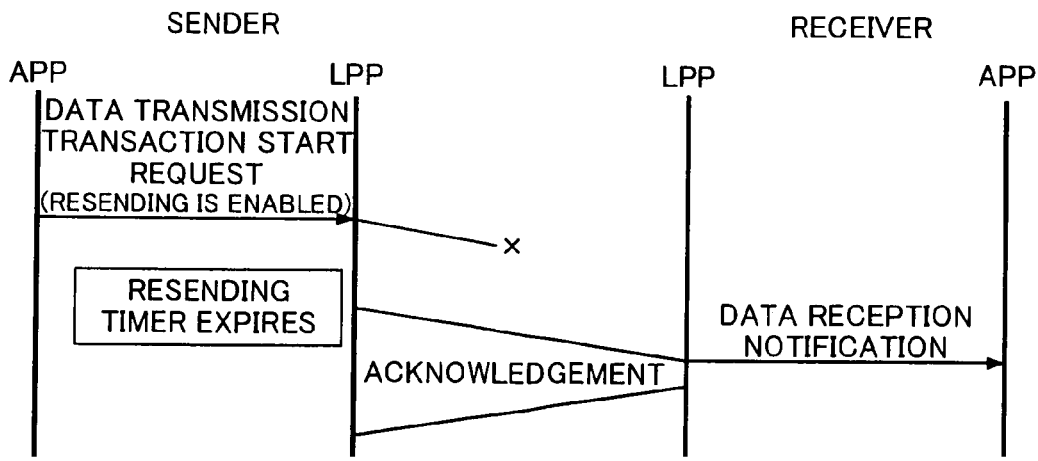
FIG. 27 is a diagram illustrating an example of data resending.

This function is provided to ensure the reliability of communication, and controls resending of data, using a resend timer and a resend counter. When the resend timer expires, the LPP resends the data (up to a maximal number of resending times), thereby ensuring the reliability of communication (refer to FIG. 27). This function can be applied to data-sending and data-resending, and an application specifies whether or not to enable this function. The processing sequence is shown as follows:

FIG. 27 is a diagram illustrating an example of data resending.

When sending a packet, the LPP starts the resend timer and sets the resend counter to "0".

If a response data can not be received before expiration of the resend timer, the LPP increments the resend counter and sends the packet again.

If the resend counter exceeds the maximal number of resending times, the LPP ends the transaction and notifies the application of the fact.

In a transaction using the data resend function, the PDU received previously may be received again due to any acknowledgement not being received, or the like. The LPP detects the duplicate receiving by using the transaction ID (refer to FIG. 28). The particular checking method is not specified here, while leaving it as the prerequisite for implementation.

Figure 28:
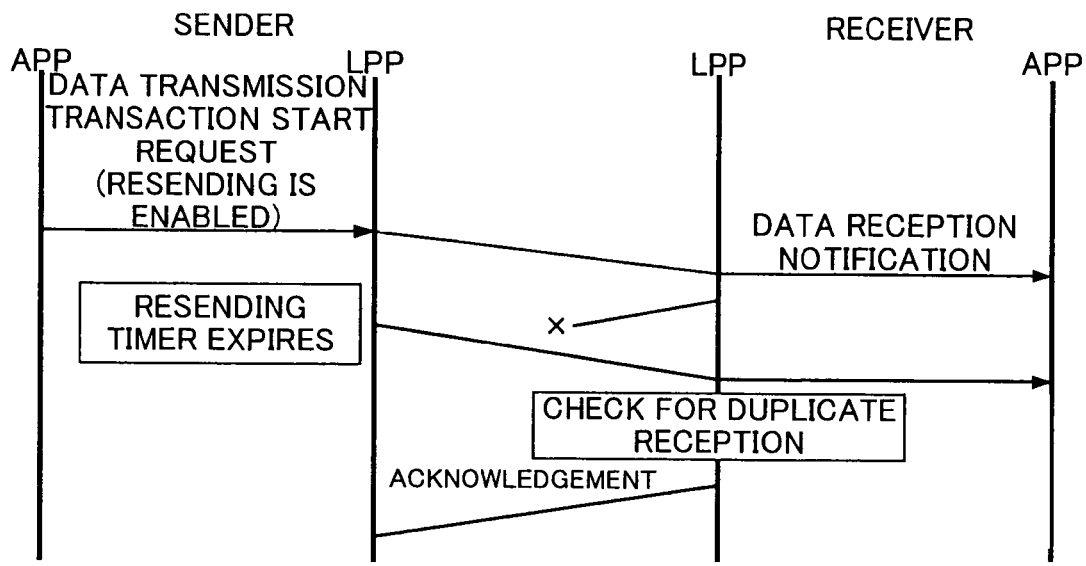
FIG. 28 is a diagram illustrating an example of checks for duplicate receiving.

FIG. 28 is a diagram illustrating an example of checks for duplicate receiving.

2.2.1.2.3 Message Segmentation/Re-Assembly Function

This function segments and assembles a message so that the sending interface, for a message, that exceeds the MTU of the LPCP can be provided to an application.

Figure 29:
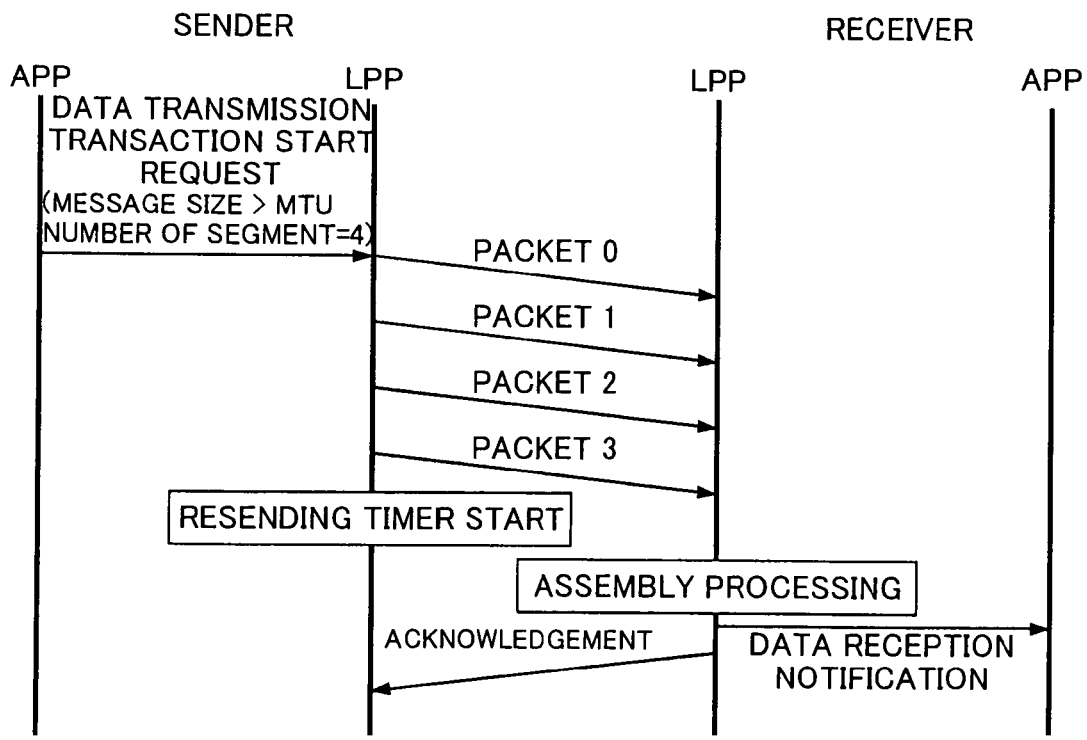
FIG. 29 is a diagram illustrating an example of segmentation/assembly processing of a message.

FIG. 29 shows the message communication procedure using the segmentation/re-assembly function. When receiving from an application a message that exceeds the MTU of the LPCP, the LPP divide the PDU into segments having the size of the MTU of the LPCP, and operates to pass the segments one by one to the LPCP. The packets divided in this way are piled up on the sending queue of the DSRC-ASL, and are then transferred to the layer 7. In this situation, because it is anticipated that the sending queue of the DSRC-ASL may overflow, the LPP ensures that all the packets are sent, by resending packets that have been unsuccessfully sent, or by implementing flow control.

The receiving side sequentially takes in the divided packets passed from the LPCP, while piling up them on the receiving queue prepared by the receiving-side application. In this situation, due to the resend processing in the layer 2 and the like, it is uncertain that each packet is stored in the receiving queue in the order of sending; therefore, the receiving side assembles the packets into the PDU, by determining the assembling order by means of the sequence numbers assigned to each packet. The receiving side returns an acknowledgement to the sending side, after receiving all the packets.

In addition, it is anticipated that some packets may be lost due to the overflow of the receiving queue in the DSRC-ASL or data loss in the DSRC; therefore, it is not ensured that all the sent packets are delivered to the LPP of the opposite station. In this case, one lost packet may induce loss of the entire message data; therefore, by notifying the sending side, through a negative acknowledgement, of the packets that have not been received by the time when the final packet is received and by resending the lost packets (selective resend processing), the arrival of the entire massage is ensured. With regard to loss of the final packet, its arrival is ensured by means of the normal resend processing. The same control is applied to packets sent by selective resending.

Figure 30:
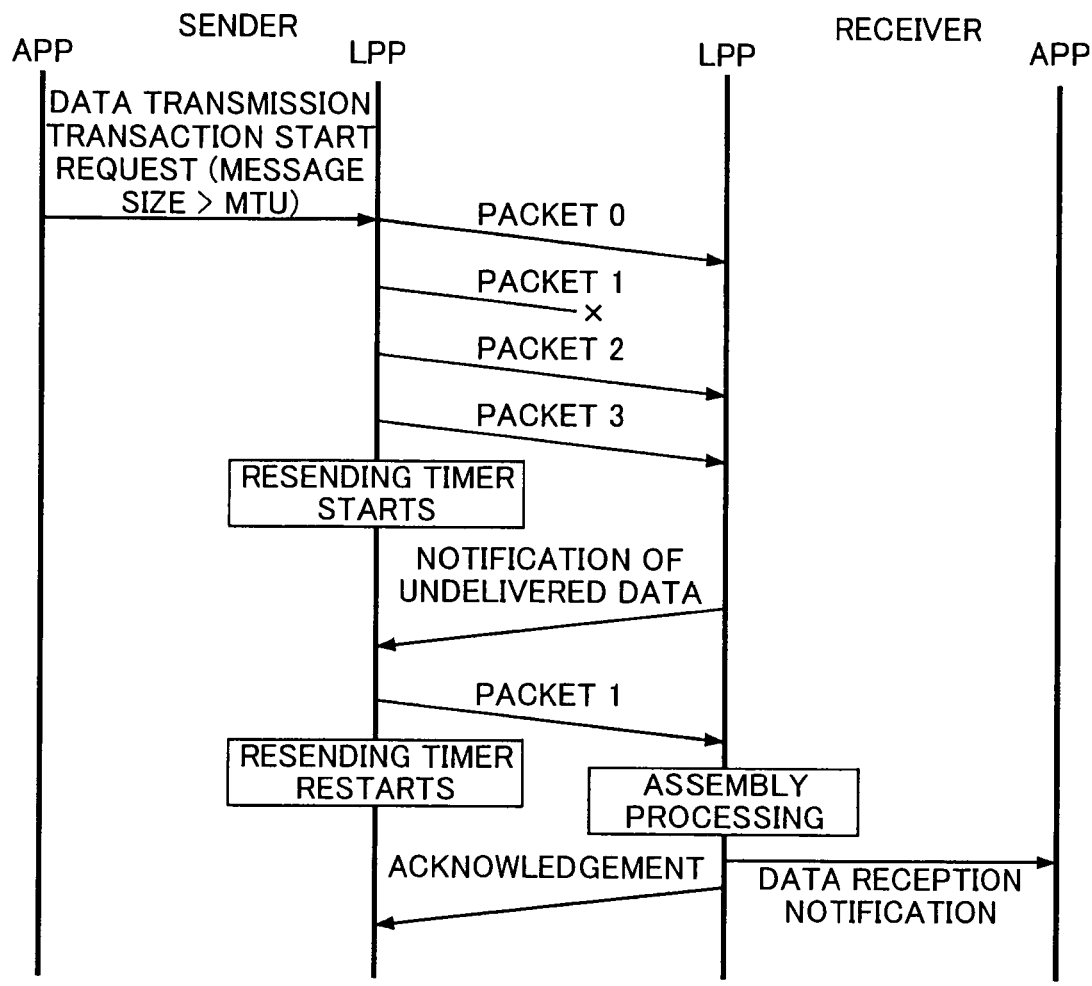
FIG. 30 is a diagram illustrating an example of selective resend processing.
Figure 31:
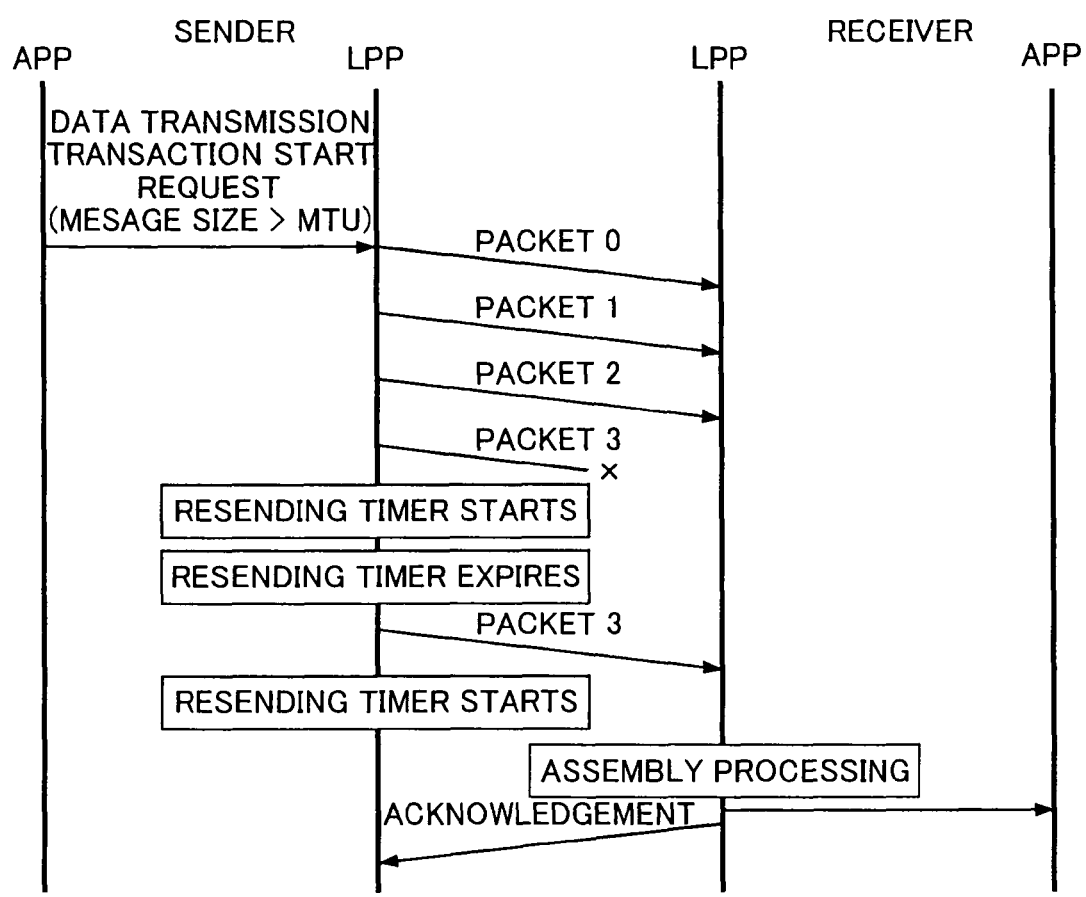
FIG. 31 is a diagram illustrating an example of final packet resend processing.

FIG. 30 illustrates an example of the selective resend processing.

Because it is anticipated that the size of the receiving queue required for each application is significantly different from another, each application prepares its own receiving queue for this function. Therefore, with regard to transactions requiring disassembly and assembly, only one transaction is to be sent at a time for each destination (that is identified by the link address and the destination port number).

Moreover, in the case of sending data to broadcast addresses, without performing the return of an arrival acknowledgement, the selective resend processing, and final segment resend control, the required reliability of communication is ensured by means of the transaction re-execution request.

Figure 32:
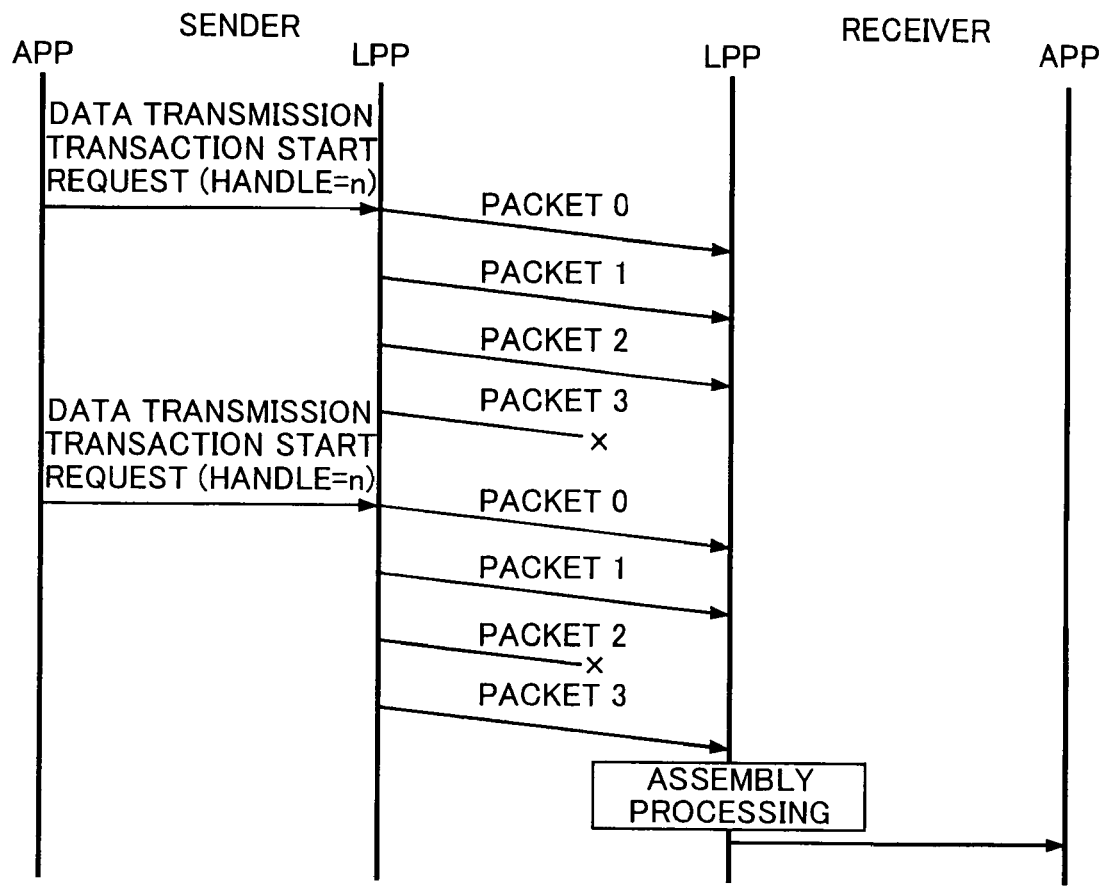
FIG. 32 is a diagram illustrating an example of transaction re-execution.

FIG. 32 illustrates an example of the transaction re-execution processing.

2.2.1.3 Transaction Abortion Function

Figure 33:
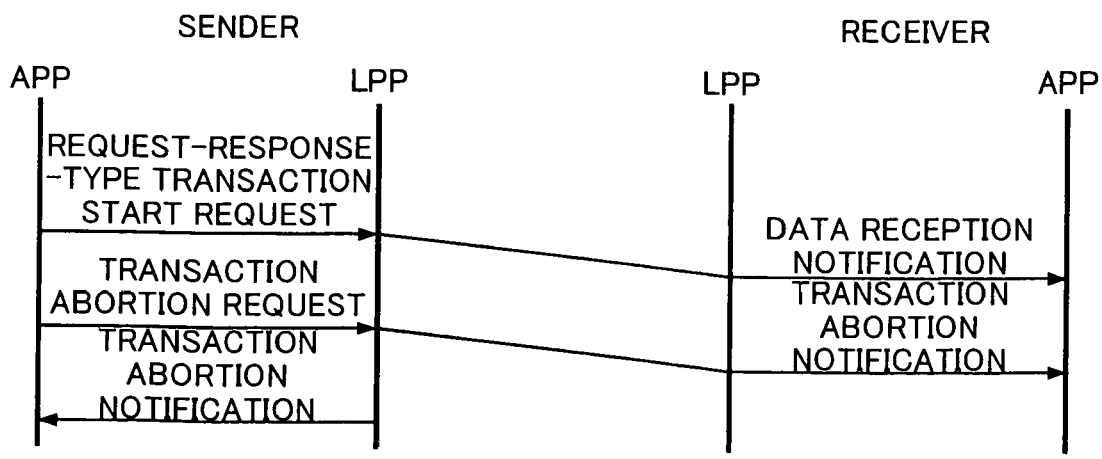
FIG. 33 is a diagram illustrating an example of transaction abortion notification.

In the case of a request-response-type transaction, abortion of a transaction can be requested by an application (refer to FIG. 33). The LPP performs the following processing according to the transaction status at the time of request.

(1) When a message has not been sent, the LPP aborts the message.

(2) When a message has been already sent or is being sent, the LPP aborts all data related to the transaction, and notifies the opposite station that the transaction has been aborted.

When the transaction abortion request issued by the opposite station is received, the LPP notifies the application that the transaction will be aborted, and then abort all data related to the transaction.

FIG. 33 is a diagram illustrating an example of transaction abortion notification.

In addition, in the following cases, in order to suppress unnecessary communication, the LPP does not start transaction, but notifies the application that the request has not succeeded:

the DSRC is disconnected the destination port is not an accept port

2.2.2 Connection Management Service

In the connection management service, the LPP provides the application with the following services, thereby providing the application with the start/end trigger of a communication:

a service in which the LPP manages and monitors the connection status of the DSRC and, by request from an application, reports the connection status and notifies of new connection or disconnection.

a service in which, during the respective connection management services, the LPPs in the roadside station and the mobile station notify each other of the respective accept port numbers, thereby managing the accept port numbers of the opposite station; then the LPP reports the status of the accept port numbers by request from an application and notifies that a certain port turned acceptable.

In addition, the connection management service is regarded as being on the similar level as that of an application on the LPCP; sending and receiving of events during the respective connection management services of the roadside station and the mobile station utilizes the data transfer service of the LPCP. The port number that the connection management service utilizes is set to 0x0FFF for the time being.

2.2.2.1 DSRC Connection Query Service

This service has a function for querying whether the DSRC is connected or not. Two types of service are specified, i.e., reference service in which the LPP immediately responds with the DSRC connection status at the time of query, and notification service in which the LPP waits for connection being implemented when the DSRC is disconnected and notifies of the connection status at the time of connection.

2.2.2.2 DSRC Disconnection Notification Service

This service has a function for notifying an application requesting disconnection notification of disconnection of the DSRC.

2.2.2.3 Accept Port Query Service

This service has a function for querying whether or not any accept port is present in the opposite station. There are three types of port statuses as follows:

Accept port: This port is opened by the opposite station as a data-receiving port.

Reject port: This port is not opened by the opposite station as a data-receiving port.

Unknown port: It is not known whether or not this port is opened by the opposite station as a data-receiving port. This is an initial status.

Two types of accept port query service, i.e., reference service and notification service, are specified; in the reference service, the LPP, immediately after receiving a query, returns the status of a port about which a query is implemented, and in the notification service, the LPP waits until the port about which a query is implemented changes to be in the accept status, and then implements notification at the time the LPP receives an accept port notification from the opposite station (if it is already known that the port about which the query is implemented is an accept port, the LPP replies immediately.).

In order to enable the foregoing two types of service, the management service, in the LPP, between the roadside station and the mobile station has a function for notifying the opposite station of the accept port numbers of the own station and the reject port numbers when the DSRC is connected, or when change in the accept ports occurs.

2.3 Interface with Application

Next, the interface between the LPP and an application will be described.

2.3.1 Explanation for Notation

The primitive types specified according to the present invention is listed in FIG. 34.

The parameter types utilized in the primitive definition table in the present invention table is listed in FIG. 35.

2.3.2 Transaction Service Primitive

As the transaction service, the LPP provides an application with two types of primitives listed below:

Invoke (transaction start primitive)

Abort (transaction abortion primitive)

2.3.2.1 Invoke

Transaction Start Primitive (1) Summary of Processing

The invoke primitives are to form new transaction. Every transaction is started by issuing the primitive.

(2) Definition

FIG. 36 is a table denoting Invoke primitive parameters.

Link Address: a LID of the DSRC, or an ID that can be mapped on one-to-one with a LID.

Source Port: the port number of a sending-source application

Destination Port: the port number of a destination application

User Data Size: the size of transmitted data (unit: octet)

User Data: transmitted-data body

Transaction Type: type of transaction service

0: data-sending transaction service

1: request-response-type transaction service

Require Ack: flag to indicate whether or not resend processing is enabled (0: resend processing is not requested, 1: resend processing is requested)

Result Timeout: time-out duration with regard to receiving Result PDU in request-response-type transaction service After Invoke.req is issued, if Result PDU is not received within the period, the request-response-type transaction service is aborted.

Handle: ID for identifying transaction in local station This ID is designated by an application. The "Handles" designated here need to satisfy the following conditions:

in the Invoke.req-issuing station, "Handle" and "Source Port" shall uniquely be identified by means of a transaction ID; and in the Invoke.res-issuing station, "Link Address", "Source Port", and the transaction ID shall uniquely be identified by means of "Handle". In broadcast communication, when the same "Handle" as that of the previous broadcast communication that has been implemented shortly before is designated, the "Handle" is treated as a request for another implementation of the transaction.

2.3.2.2 Abort

Transaction Abort Primitive (1) Summary of Processing

The Abort primitives are to abort transactions that have been created.

(2) Definition

FIG. 37 is a table denoting Abort primitive parameters.

Abort Type: to indicate whether the abortion is due to a system error or a user request Abort Code: to indicate the reason for abortion of the transaction (As far as system errors are concerned, refer to FIG. 38.)

Handle: ID for identifying transaction in local station

FIG. 38 is a table denoting an Abort code list in the case where Abort Type 0 (system error).

2.3.3 Connection Management Service

As the connection management service, the LPP provides an application with four types of primitives listed below:
  Connect: (transaction start query/notification primitive)
  Disconnect: (DSRC disconnection notification primitive)
  Register Port (port registration primitive)
  Deregister Port (port deregistration primitive)

2.3.3.1 Connect

Transaction Start Query/Notification Primitive (1) Summary of Processing

"Connect.req" primitive is to query whether transaction can be started or not. "Connect.cnf" primitive is to notify a query-source application of the connection of DSRC, a LID, and an accept port number in the opposite station (indicated by the LID), with regard to a query by means of Connect.req.

(2) Definition

FIG. 39 is a table denoting Connect primitive parameters.

Querist Port: a query-source port number used to identify the application that has queried Query LID: a LID to be queried When a LID has been designated, this parameter is treated as a query for an already connected link. In contrast, when no LID has been designated, this parameter is treated as waiting for a new connection. When both "Query LID" and "Query Port" are omitted, "Connect.cnf" is issued immediately after the DSRC is connected (fast connection). in contrast, when "Query Port" is designated, "Connect.cnf" is issued after accept port notification is received (normal connection).

Query Port: a destination port number to be queried

Time Out: a waiting time for "Connect.cnf" being issued, when the DSRC has not been connected When the DSRC is connected during the waiting time, "Connect.cnf" is immediately issued. When this parameter is omitted, the waiting time is treated as "∞".

Connected LID: When "Query LID" has been designated, and the LID is being connected, a LID that is the same as the "Query LID" is designated. When "Query LID" has been designated, and the LID has not been connected, and when "Query LID" has not been designated, and no new connection is not implemented within the time specified by a "Time Out" parameter, "−1" is designated for "Connected LID".

Accept Port: an accept port number in the opposite station that is indicated by "Connected LID" When the port number is designated by "Query Port", "Accept Port" notifies only the port number. When the designated number is a reject port number, "−1" is designated for "Accept Port". When "Query Port" is omitted, "0" is designated for "Accept Port". 72.3.3.2 DSRC Disconnect DSRC Disconnection Notification Primitive (1) Summary of Processing This primitive is to notify an application of disconnection of the DSRC.

(2) Definition

FIG. 40 is a table denoting Disconnect primitive parameters.

2.3.3.3 Register Port

Port Register Primitive (1) Summary of Processing

"Register Port primitive" is to register a receiving port with the LPP.

(2) Definition

FIG. 41 is a table denoting Register Port primitive parameters.

Port No.: accept port number

Bulk Area: This is an area where disassembled segments of a message are reassembled.

Bulk Area Size: size of bulk area

2.3.3.4 Deregister Port

Port Deregister Primitive (1) Summary of Processing

"Deregister Port primitive" is to deregister a receiving port with the LPP.

(2) Definition

FIG. 42 is a table denoting Deregister Port primitive parameters.

Port No.: Receiving port number to be deregistered

2.4 Protocol Data Unit (PDU)

Next, the LPP Protocol Data Unit (PDU) that is used in the transfer service and the connection management service will be described.

2.4.1 Transaction Service Protocol Data Unit

The PDUs used in the transaction service are classified into seven types corresponding to situations, as shown in FIG. 43. The PDU used in the transaction service consists of the header portion defined for each PDU type and the data portion in which application data is stored.

FIG. 44 shows a basic structure of the PDU.

2.4.1.1 Invoke PDU

FIG. 45 is a table denoting the header information of Invoke PDU.

PDU Type: This field indicates the PDU type. In the Invoke PDU, this field is always "Invoke (1)".

Version: This field indicates the LPP version. The current version is 0x00.

TT: "TT" is the abbreviation of "Transaction Type". "TT" designates the transaction type. 0: Data-sending transaction service1: Request-response-type transaction service "RA" is the abbreviation of "Require Ack". "RA" is a flag that indicates whether resend processing is enabled or not. "RA" is "1" when the resend processing is enabled.

RD: "RD" is the abbreviation of "Retransmitted Data". "RD" is a flag that indicates whether the data is resent data or not. "RD" is "1" when the data is resent data.

TID: This field indicates the transaction ID.

RES: Reservation

2.4.1.2 Result PDU

FIG. 46 is a table denoting the header information of Result PDU.

PDU Type: This field indicates the PDU type. In the Result PDU, this field is always "Result (2)".

RA: "RA" is the abbreviation of "Require Ack". "RA" is a flag that indicates whether resend processing is enabled or not. "RA" is "1" when the resend processing is enabled.

RD: "RD" is a flag that indicates whether the data is resent data or not. "RD" is "1" when the data is resent data.

TID: This field indicates the transaction ID.

RES: Reservation

2.4.1.3 Acknowledgement PDU

FIG. 47 is a table denoting the header information of "Acknowledgement PDU".

PDU Type: This field indicates the PDU type. In "Acknowledgement PDU", this field is always "Ack (3)".

RD: "RD" is a flag that indicates whether the data is resent data or not. "RD" is "1" when the data is resent data.

TID: This field indicates the transaction ID.

RES: Reservation

2.4.1.4 Abort PDU

FIG. 48 is a table denoting the header information of "Abort PDU".

PDU Type: This field indicates the PDU type. In the "Abort PDU", this field is always "Abort (4)".

AT: This field is a flag that indicates whether the abortion is due to a system error "0" or due to a user's request "1".

TID: This field indicates the transaction ID.

Abort Code: This field designates as a code the reason for aborting the transaction (refer to FIG. 38).

RES: Reservation

2.4.1.5 Invoke Segment PDU

FIG. 49 is a table denoting the header information of "Invoke Segment PDU".

PDU Type: This field indicates the PDU type. In "Invoke Segment PDU", this field is always "Invoke Sgm (5)".

Version: This field indicates the LPP version. The current version is 0x00.

TT: "TT" is the abbreviation of "Transaction Type". "TT" designates the transaction type.

0: Data-sending transaction service

1: Request-response-type transaction service

FIN: "FIN" is a flag that indicates whether the segment is the final one or not. "FIN" is "1" when the segment is the final one.

RD: "RD" is the abbreviation of "Retransmitted Data". "RD" is a flag that indicates whether the data is resent data or not. "RD" is "1" when the data is resent data.

TID: This field indicates the transaction ID.

Segment No.: This field indicates the serial number of the PDU.

2.4.1.6 Result Segment PDU

FIG. 50 is a table denoting the header information of "Result Segment PDU".

PDU Type: This field indicates the PDU type. In "Result Segment PDU", this field is always "Result Sgm (6)".

FIN: "FIN" is a flag that indicates whether the segment is the final one or not. "FIN" is "1" when the segment is the final one.

RD: "RD" is a flag that indicates whether the data is resent data or not. "RD" is "1" when the data is resent data.

TID: This field indicates the transaction ID.

RES: Reservation

Segment No.: This field indicates the serial number of the PDU.

2.4.1.7 Nack PDU

FIG. 51 is a table denoting the header information of "Nack PDU".

PDU Type: This field indicates the PDU type. In "Nack PDU", this field is always "Nack (7)".

RD: "RD" is a flag that indicates whether the data is resent data or not. "RD" is "1" when the data is resent data.

TID: This field indicates the transaction ID.

RES: Reservation

Num Seg: This field indicates the sequential numbers of PDUs that have not been received yet.

Segment Number List: This field lists up the sequential numbers of PDUs that have not been received yet.

2.4.2 Protocol Data Unit of Connection Management Service

When the DSRC is newly connected or when the number of accept ports has increased or decreased, the connection management service of the LPP notifies the opposite-station connection management service of the accept port list and the reject port list by means of the transfer service of the LPCP. PDUs shown below are utilized for these types of notification and stored in the user data area in the LPCP.

2.4.2.1 PDU in Accept Port List Notification

FIG. 52 is a table denoting protocol data units in the case of notifying an accept port list.

Status: This field indicates the event type. In the case of notifying an accept port list, this field always stores "accept Port List (1)".

Num Ports: This field stores the number of accept port numbers.

Accept Port List: This field stores the list of accept port numbers.

2.4.2.1 PDU in Reject Port List Notification

FIG. 53 is a table denoting protocol data units in the case of reject port notification.

Status: This field indicates the event type. In the case of notifying a reject port, this field always stores "reject Port (2)".

Reject Port: This field stores reject port numbers.

2.5 Processing Procedure

The processing procedure in the LPP will be described.

Figure 54:
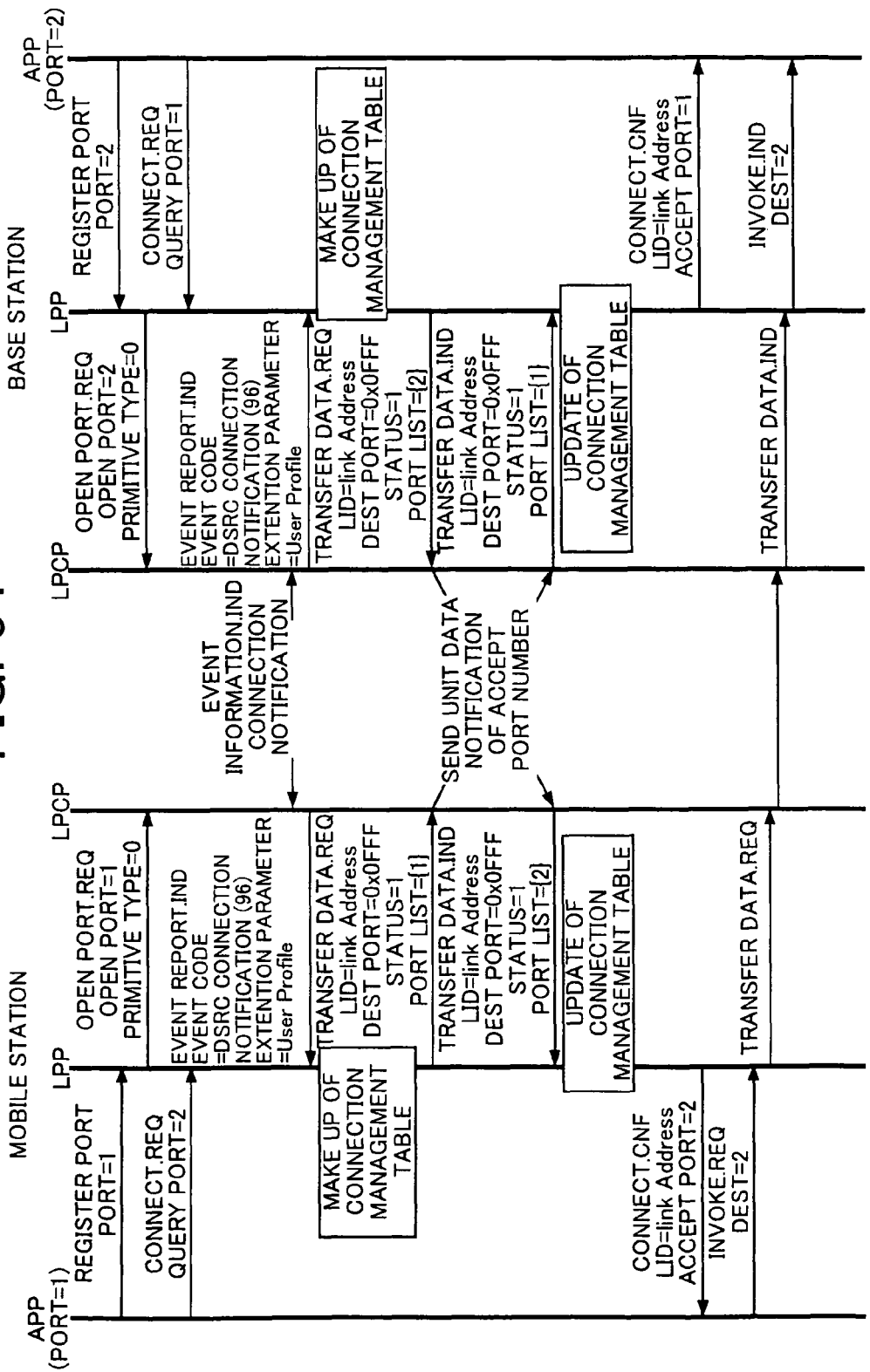
FIG. 54 is a diagram illustrating an initial setup procedure of LPP.

2.5.1 Initial Setup Procedure (1) Initial Setup Procedure for Normal Applications FIG. 54 is a diagram illustrating an initial setup procedure of the LPP.

(a) Each application in a mobile station and the base station registers accept port numbers with the LPP by means of the port registration primitive (Register Port).

(b) The LPP updates the connection management table and registers as the data-receiving port the accept port numbers and the connection management service port with the LPCP. In addition, the management service port is registered as the accept port with the LPCP.

(c) Each application, issues a DSRC connection query primitive (Connect. req) with the Query LID parameter being not designated and with Query Port parameter being designated, and waits for the connection of the DSRC (blocking call).

(d) The connection management service of the LPP receives the event "DSRC connection notice (96)" by means of the event notification primitive (Event Report) from the LPCP.

(e) The connection management service of the LPP creates the connection management table for the link address received by means of the event notification primitive and transmits the accept port list to the connection management service port of the opposite station.

(f) When the connection management service of the LPP receives from the LPCP the accept port list by means of the data transfer primitive (Send Unit Data.ind), the LPP registers the accept ports with the connection management table at the link address notified by means of the data transfer primitive. Thereafter, transaction start requests to this link address only are accepted.

(g) The LPP notifies, by means of a DSRC connection notification primitive (Connect.cnf), the application that issues a DSRC connection query primitive (Connect.req) to the port number included in the accept port list that has been received in (e) described above of the LID and the accept port number.

(h) A transaction is started with a transaction start request (Invoke.req) that the application issues to the LID notified by means of the connection notification primitive (Connect.cnf) or the broadcast address and the accept port number.

(2) Initial Setup Sequence for Fast Connection Application

"Fast connection" is an approach for realizing fast initial setup connection by omitting part of processing for the initial setup.

Figure 55:
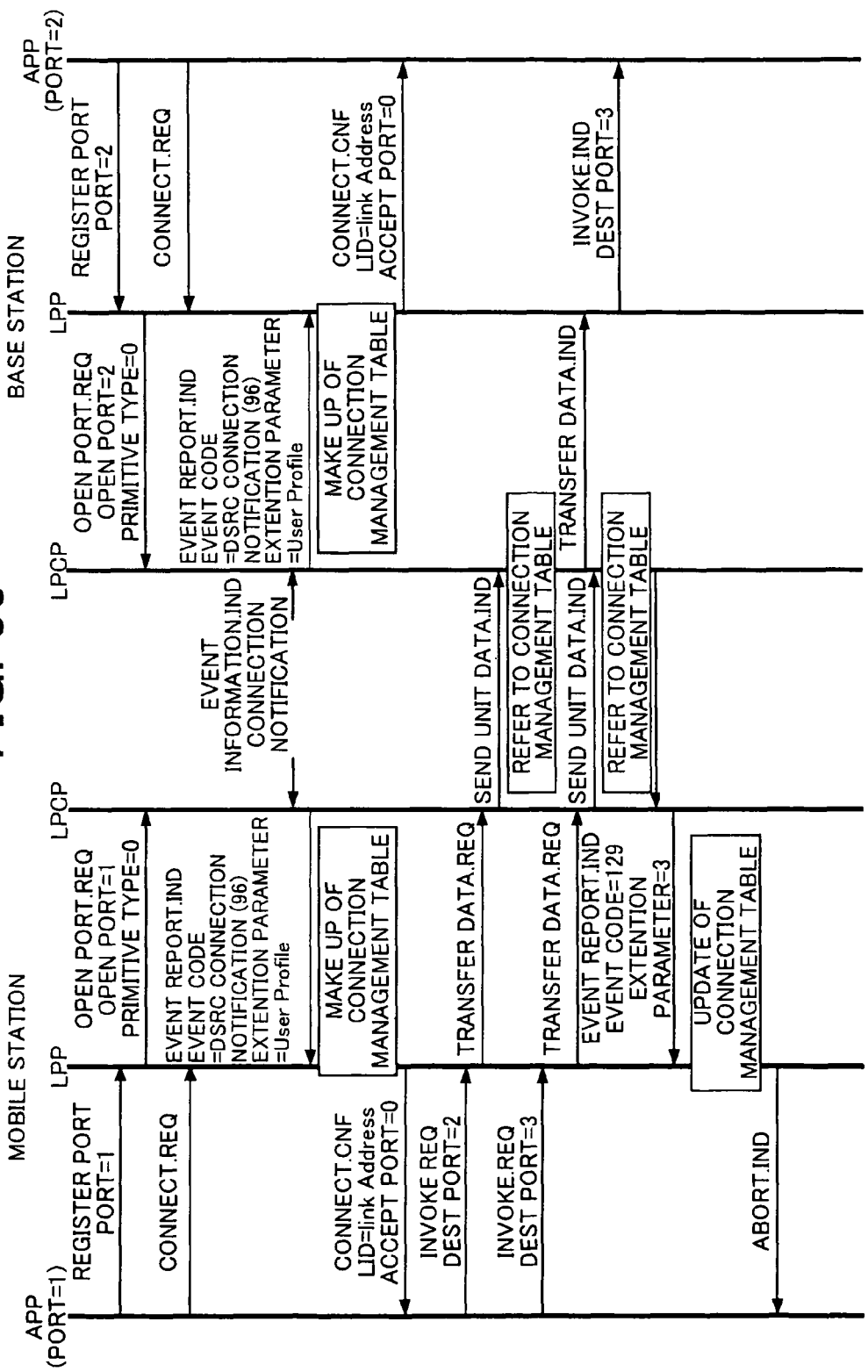
FIG. 55 is a diagram illustrating an example of initial setup sequences in a fast connection application.

FIG. 55 is a diagram illustrating an example of initial setup sequence for a fast connection application.

(a) Each application in a mobile station and the base station registers accept port numbers with the LPP by means of the port registration primitive (Register Port).

(b) The LPP updates the connection management table and registers accept port numbers with the LPCP.

(c) Each application issues a transaction start enable query primitive (Connect.req) with the Query LID and the Query Port being not designated and waits for the connection of the DSRC.

(d) The LPP receives from the LPCP the event "DSRC connection notice (96)" by means of the event notification primitive (Event Report. ind).

(e) The LPP creates a connection management table for the LID received by means of the event notification primitive. Thereafter, for an application requiring the fast connection, the LPP accepts transaction start requests to the link address and all broadcast addresses until the LPP receives the accept port list of the opposite station from the connection management service of the opposite-station LPP.

(f) The LPP notifies the application that has issued the DSRC connection query primitive (Connect.req) of the LID by means of DSRC connection notification primitive (Connect.cnf).

(g) Each application issues a transaction start request primitive (Invoke.req) to the LID notified by means of the DSRC connection notification primitive or broadcast addresses and starts the transaction.

(h) If the port number designated in (g) described above is opened in the opposite station, this transaction succeeds. If the port number designated in (g) described above is not opened in the opposite station, the event "the destination local port is not enabled (129)" is notified from the opposite station by means of the event notification primitive, and the LPP updates the connection management table for this link address. In the case where Transaction Type=1, the LPP notifies by means of a transaction abortion notification primitive (Abort.ind) the corresponding application of the fact that the transaction has failed. Thereafter, if a transaction start request (Invoke.req) with Transaction Type 1 is issued to the combination of the link address and the port number, the LPP notifies by means of a transaction abort primitive (Abort. ind) that the transaction has been aborted.

2.5.2 Data Transfer Procedure of Data-Sending Transaction Service (1) Transmission Processing (a) A transaction of data-sending service is started with the issue of a transaction start request primitive (Invoke. req) with Transaction Type 0 by an application.

(b) When the designated combination of the link address and sending source port number is a reject port, the LPP notifies the application of the state "reject port notification" by means of Abort.ind, and the transaction is ended.

(b) When the designated message exceeds the MTU and does not support segmentation/assembly processing, the LPP notifies by means of Abort.ind the application of the state "MTU error", and the transaction is ended. The processing in the case where segmentation/assembly processing is supported will be described in Section 2.5.5.

(d) In any case other than (b) and (c) above, the LPP creates the Invoke PDU denoting that TT 0 and then sends it to the opposite station by means of the Transfer Data.req of the LPCP. The processing in the case where resend processing is enabled will be described in Section 2.5.4.

(2) Receiving Processing

When receiving the Invoke PDU sent in (1)-(d) above by means of the transfer primitive (Transfer Data.ind) of the LPCP, the LPP notifies the application by means of a transaction notification primitive that the data has been received.

Figure 56:
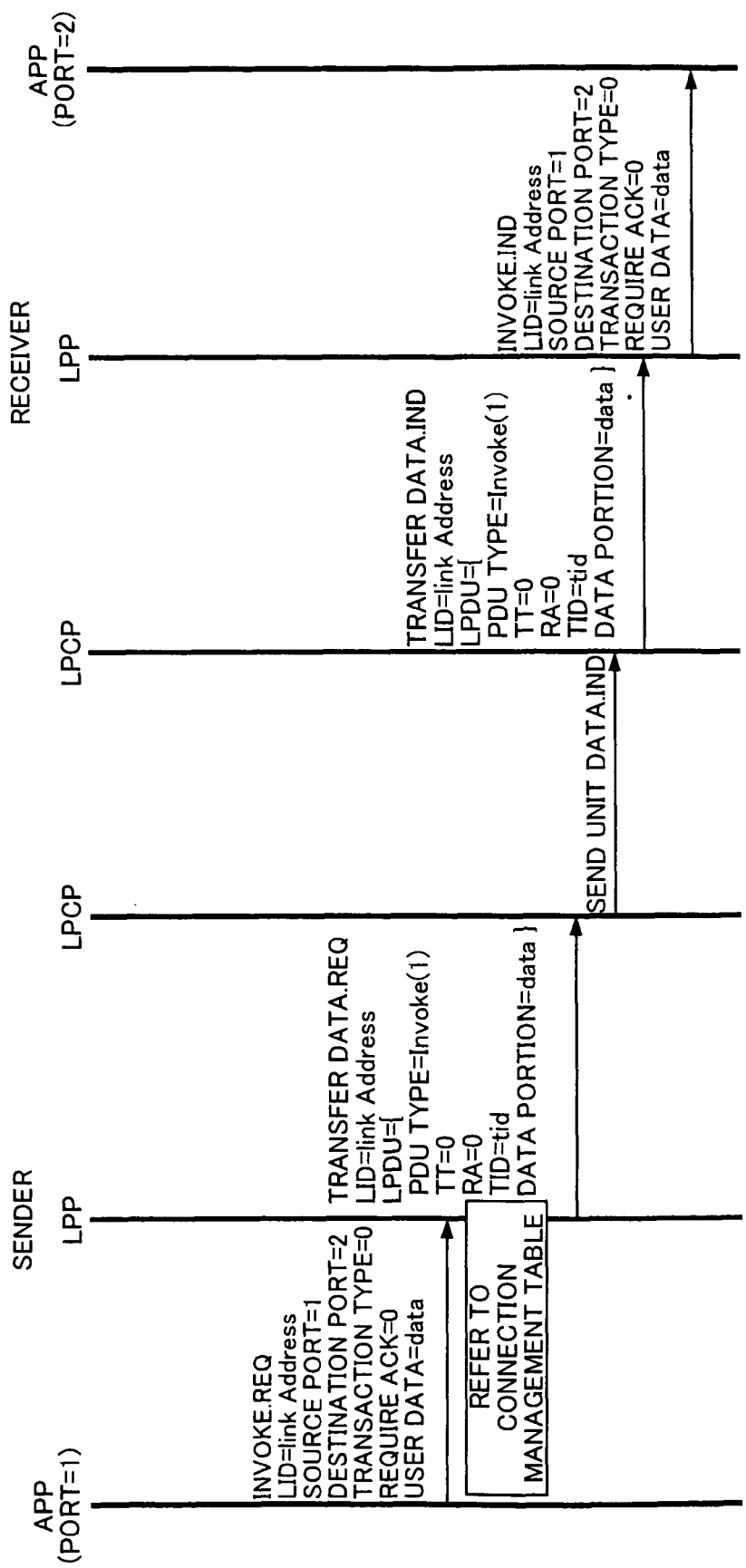
FIG. 56 is a diagram illustrating an example of the processing sequence in a data-sending transaction service.

FIG. 56 is a diagram illustrating an example of the processing sequence of the data transfer procedure of the data-sending transaction service.

2.5.3 Data Transfer Procedure of Request-Response-Type Transaction Service (1) Transmission Processing (a) A transaction of the request-response-type transaction service is started with issue of a transaction start request primitive (Invoke.req) with Transaction Type 1 by an application.

(b) When the designated combination of the link address and sending source port number is a reject port, the LPP notifies the application of the state "reject port notification" by means of Abort.ind, and the transaction is ended.

(c) When the number of transactions exceeds a concurrently executable number, the LPP notifies the application of the state "the transaction could not be started" by means of Abort.ind, and the transaction is ended.

(d) When the designated message exceeds the MTU and does not support segmentation/assembly processing, the LPP notifies by means of Abort.ind the application of the state "MTU error", and the transaction is ended. The processing in the case where segmentation/assembly processing is supported will be described in Section 2.5.5.

(e) In any case other than (b), (c), and (d) above, the LPP creates the Invoke PDU denoting that TT 1 and, after sending it to the opposite station by means of the transfer primitive (Transfer Data.req) of the LPCP, activates the Result timer (the time-out value thereof is specified by Invoke.req) and waits for the arrival of a Result PDU from the opposite station.

(f) When the Result timer that has been activated in (e) above expires, the LPP creates an Abort PDU, with AT being set to 0 and with Abort Code being set to 0x08, and notifies, by means of the transaction abort notification primitive (Abort.ind), the opposite station of the state "the result timer has expired", while notifying the application that the transaction has failed.

(g) When receiving the Result PDU sent by the opposite station by means of the transfer primitive (Transfer Data.ind) of the LPCP before the Result timer expires, the LPP stops the Result timer activated in (e) above, while notifying the application of the response data by means of the response notification primitive (Invoke.cnf).

(2) Receiving Processing (a) When receiving the Invoke PDU sent from the opposite station by means of the transfer primitive (Transfer Data.ind) of the LPCP, the LPP notifies the application by means of a transaction notification primitive that the data has been received and then waits for the arrival of the response primitive (Invoke.res) from the application.

(b) When receiving the Abort PDU sent from the opposite station by means of the transfer primitive (Transfer Data.ind) of the LPCP, the LPP issues the transaction abort notification primitive (Abort.ind), and notifies the application that the transaction has failed; then, the transaction is ended.

(c) The application issues the response primitive (Invoke.res), and requests the LPP to send a response.

(d) The LPP creates a Result PDU and sends it to the opposite station by means of the transfer primitive (Transfer Data.req) of the LPCP.

Figure 57:
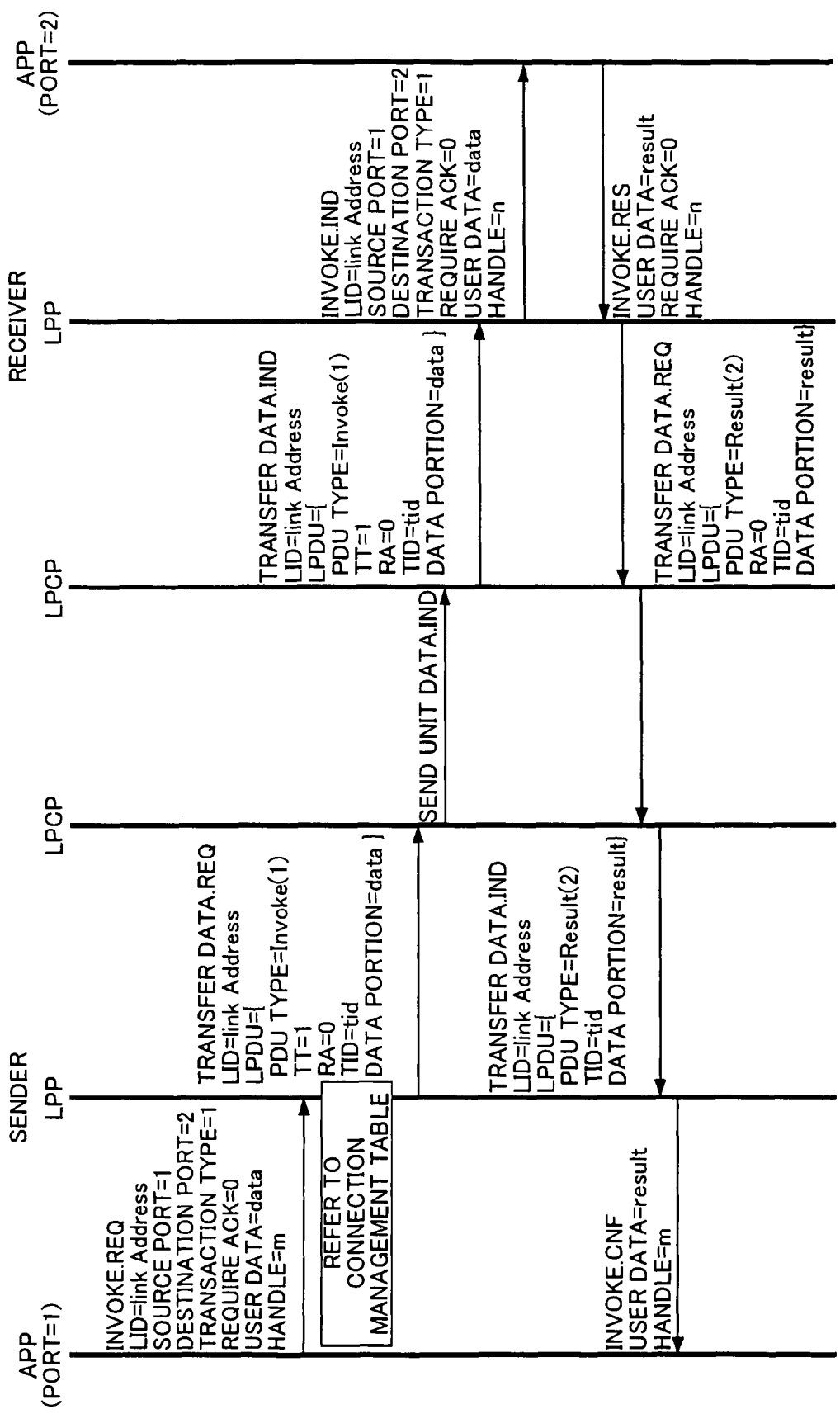
FIG. 57 is a diagram illustrating an example of the basic processing sequence in a request-response-type transaction service.
Figure 58:
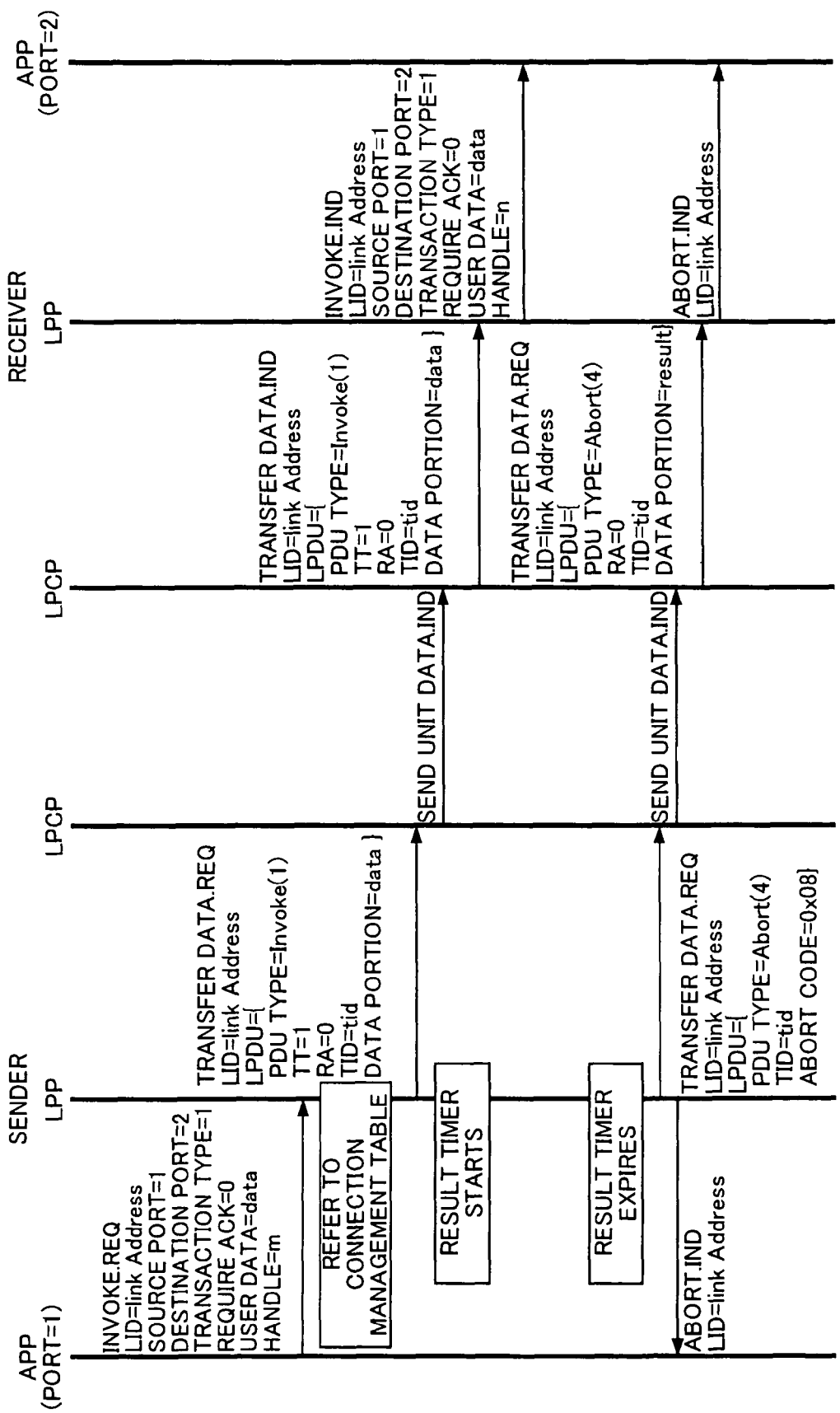
FIG. 58 is a diagram illustrating an example of the processing sequence when the Result timer expires.

FIG. 57 illustrates an example of the basic processing sequence in the request-response-type transaction service; and FIG. 58 illustrates an example of the processing sequence after the Result timer expires.

2.5.4 Data Transfer Procedure when Resend Processing is Enabled

Resend processing is applied when Require Ack is designated to 1 in Invoke.req and Invoke.res. This paragraph describes the sequence when resend processing is applied to Invoke.req of the data-sending transaction. In the request-response type transaction service, the same processing is also applicable to Invoke.res.

(1) Transmission Processing (a) A transaction of data-sending service in which resending processing is enabled is started with the issue of a transaction start request primitive (Invoke.req) with Require Ack being set to 1 by an application.

(b) The LPP creates an Invoke PDU with RA being set to 1, sends it to the opposite station using the transfer primitive (Transfer Data.req) of the LPCP, and activates the resend timer to wait for the arrival of the Acknowledgement PDU from the opposite station.

(c) When the resend timer activated in (b) above expires before the LPP receives the Acknowledgement PDU for some reason, such as the Invoke PDU sent in (b) above being not delivered, the LPP resends to the opposite station the Invoke PDU sent in (b) above with the RD flag thereof being set to 1, and then reactivates the resend timer, thereby incrementing the resend counter.

(d) After resending several times, when the resend counter exceeds a maximal number of resending times, the LPP creates the Abort PDU (refer to Section 2.4.1.4) with AT and Abort Code being set to 0 and 0x07, respectively; the LPP notifies the opposite station of the state "resend timer has expired" and also notifies the application that the transaction has failed, by means of the transaction abortion notification (Abort.ind), thereby ending the transaction.

(e) Before the resend timer expires, when receiving the PDU Acknowledgement sent by the opposite station by means of the transfer primitive (Transfer Data.ind) of the LPCP, the LPP stops the resend timer that has been activated in (b) or (c) above, thereby completing this transaction.

(2) Receiving Processing (a) When receiving the Invoke PDU sent in (1)-(d) above by means of the transfer primitive (Transfer Data.ind) of the LPCP, the LPP notifies the application by means of a transaction notification primitive (Invoke.ind) that the data has been received.

(b) When the RA flag of the PDU received in (a) above is enabled, the LPP creates the PDU Acknowledgement to send it to the opposite station by means of the transfer primitive (Transfer Data.req) of the LPCP, and then activates the wait timer.

(c) When receiving again the Invoke PDU once received in (a) above for some reason, such as the Acknowledgement PDU sent in (b) above being not delivered, the LPP aborts this PDU, creates the Acknowledgement PDU again, sends it to the opposite station by means of the transfer primitive (Transfer Data.req) of the LPCP, and activates the wait timer again.

(d) When the wait timer activated in (b) or (c) above expires, the LPP ends this transaction.

Figure 59:
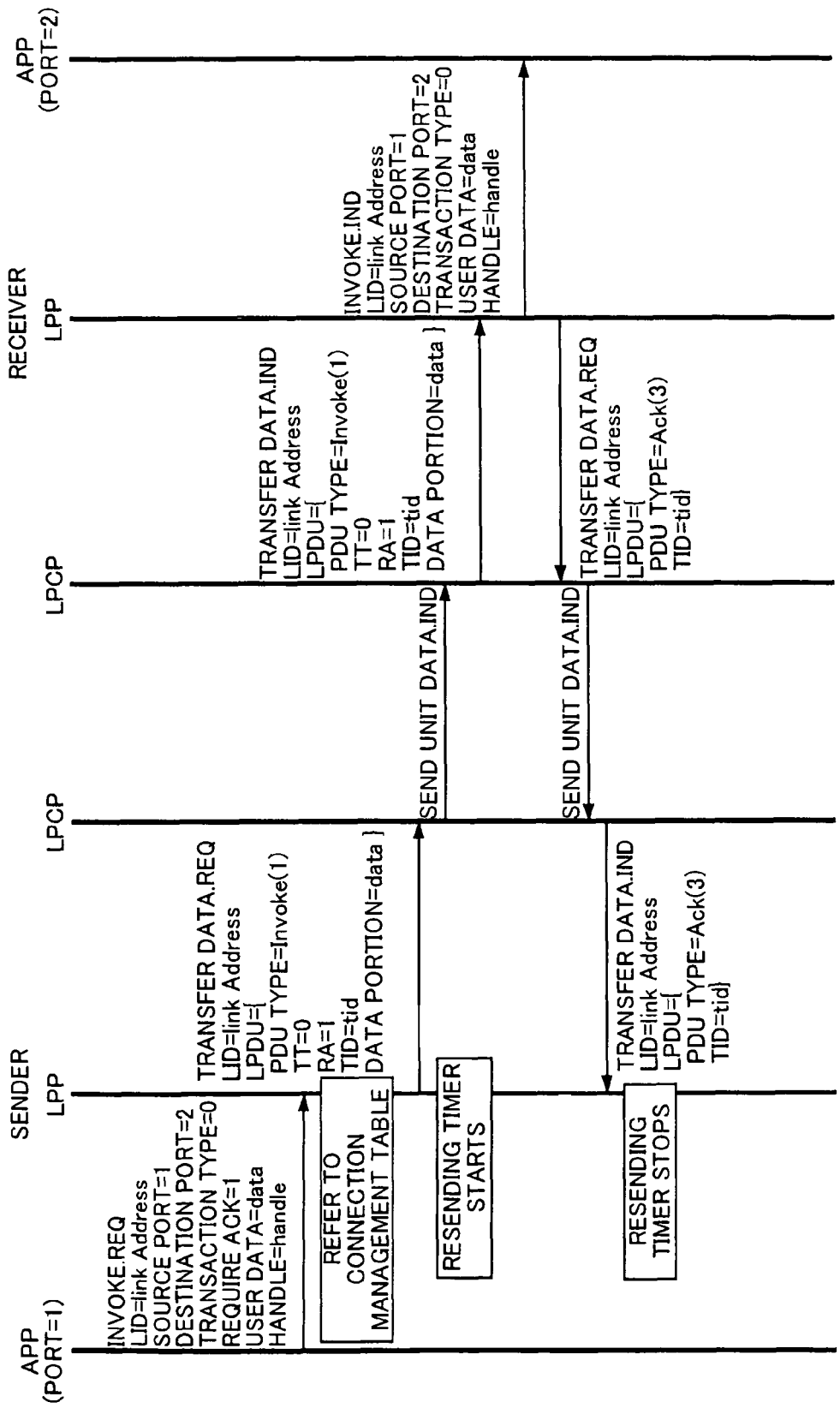
FIG. 59 is a diagram illustrating a data transfer procedure (basic sequence) when resend processing is enabled.
Figure 60:
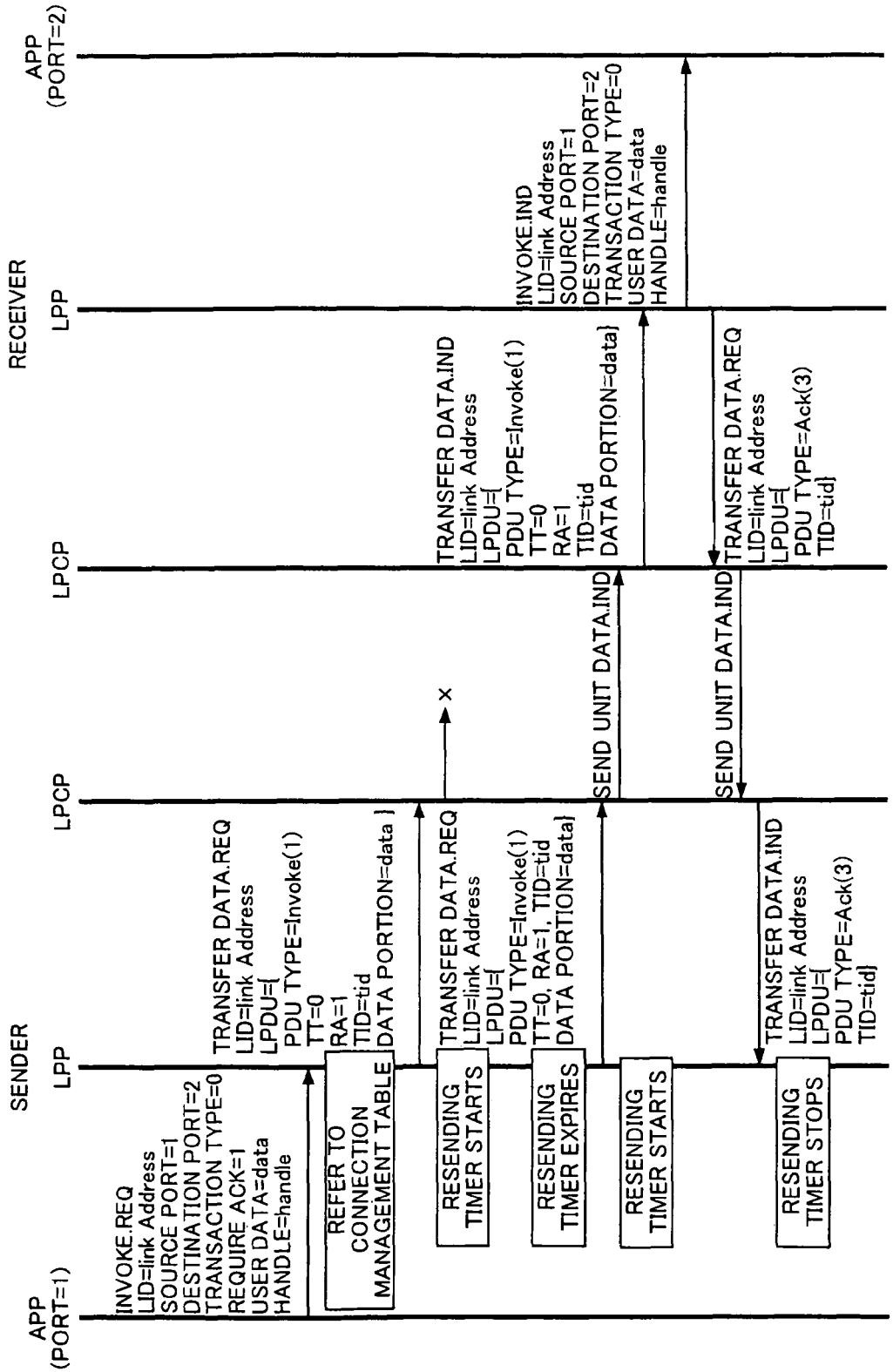
FIG. 60 is a diagram illustrating a resend processing procedure (when resend has succeeded)
Figure 61:
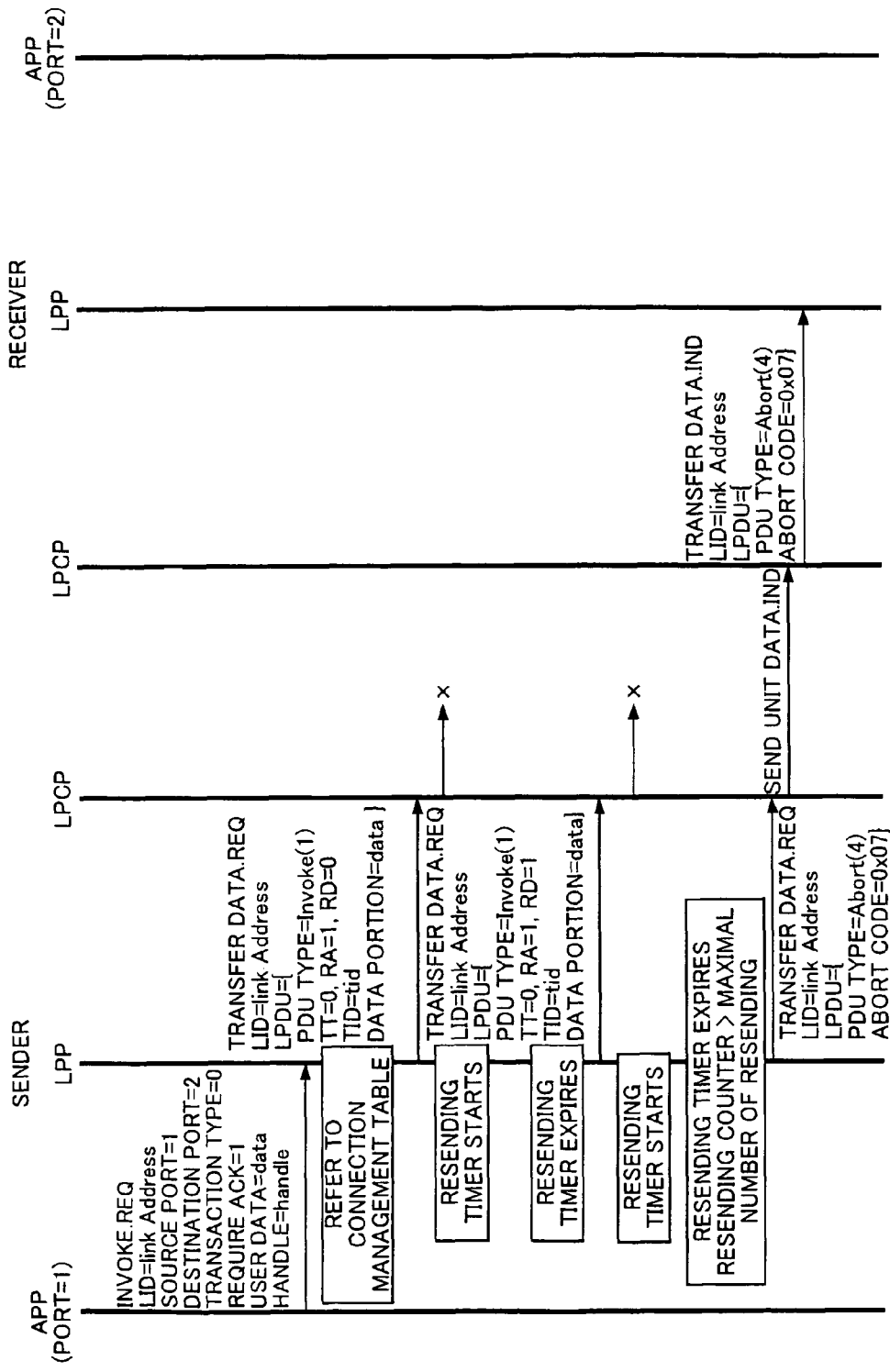
FIG. 61 is a diagram illustrating a resend processing procedure (when resend has failed)

FIG. 59 illustrates an example of processing sequence when resend processing is enabled; FIG. 60 illustrates an example of processing sequence when resend processing has succeeded; and FIG. 61 illustrates an example of processing sequence when resend processing has failed.

2.5.5 Message Transfer Procedure when Segmentation/Assembly Processing is Enabled Segmentation/assembly processing is applied when a message exceeding the MTU is designated in Invoke.req and Invoke.res. This section describes the sequence when the segmentation/assembly processing is applied to Invoke.req.

(1) Transmission Procedure
(a) An application designates a message whose size exceeds the MTU and issues the transaction start request primitive (Invoke.req), whereupon a transaction of the data sending service that enables the segmentation/assembly processing is started.
(b) When the designated combination of the link address and sending source port number is a reject port, the LPP notifies the application of the state "reject port notification" by means of Abort.ind.
(c) When a transaction requiring the segmentation/assembly processing is already being executed for the designated combination of the link address and sending source port number, the LPP notifies the application of the state "Under segmentation transmission" by means of "Abort.ind".
(d) In any case other than (b) and (c) above, the LPP disassembles the data to be sent, sequentially from the beginning, on a MTU-by-MTU basis, adds the header according to the Invoke Segment PDU (referred to Section 2.4.1.5) to each disassembled segment, and then send each segment in turn by means of the transfer primitive (Transfer Data.req) of the LPCP.
(e) When the sending queue in the ASL has overflowed and the LPCP notifies the LPP by means of the Event Report.ind of the state "there is no vacancy in the sending queue and the transmission has failed", the LPP waits for a certain period of time and then starts resending data including data that has not been sent successfully.
(f) The LPP activates the resend timer after sending the last segment data and then waits for the arrival of the Acknowledgement PDU (refer to Section 2.4.1.3) or Nack PDU (refer to Section 2.4.1.7) from the opposite station.
(g) When receiving the Nack PDU sent from the opposite station by means of the transfer primitive (Transfer Data.ind) of the LPCP, the LPP resends the segments designated in the Segment Number List for the Nack PDU. In this situation, the LPP sets RD flags of all the segments to be resent to 1 and FIN flags to be resent at last to 1. After sending the last segment data, the LPP activates the resend timer and then waits for the arrival of the Acknowledgement PDU (refer to Section 2.4.1.3) or the Nack PDU from the opposite station.
(h) When the resend timer activated in (f) or (g) above expires, the LPP resends the final segment and then activates the resend timer again.
(i) When receiving the Acknowledgement PDU sent by the opposite station by means of the transfer primitive (Transfer Data.ind) of the LPCP, the LPP stops the resend timer that has been activated in (f), (g), or (h) above, thereby completing this transaction.

(2) Receiving Procedure
(a) An application designates the assembly buffer area for received data by means of the port register primitive (Register Port).
(b) When receiving the Invoke Segment PDU by means of the transfer primitive (Transfer Data.ind) of the LPCP, the LPP stores segment data on a one-by-one basis in the receiving queue designated by the application.
(c) When receiving the final segment data, the LPP checks whether there is any unreceived segments or not. If there is any unreceived segment, the LPP creates the Nack PDU (refer to 2.4.1.7), sends it to the opposite station by means of the transfer primitive (Transfer Data.req) of the LPCP, and memorizes the final segment number to receive later.
(d) After sending the Nack PDU in (c) above, when receiving data whose RD flag has not been set for some reason, such as change in the arrival order, the LPP aborts the data.
(e) When the final segment is received, if the LPP has received all segment data, the LPP notifies the application of the received data by means of the transaction notification primitive (Invoke.ind), creates the Acknowledgement PDU, and sends it to the opposite station by means of the transfer primitive (Transfer Data.req) of the LPCP.

Figure 62:
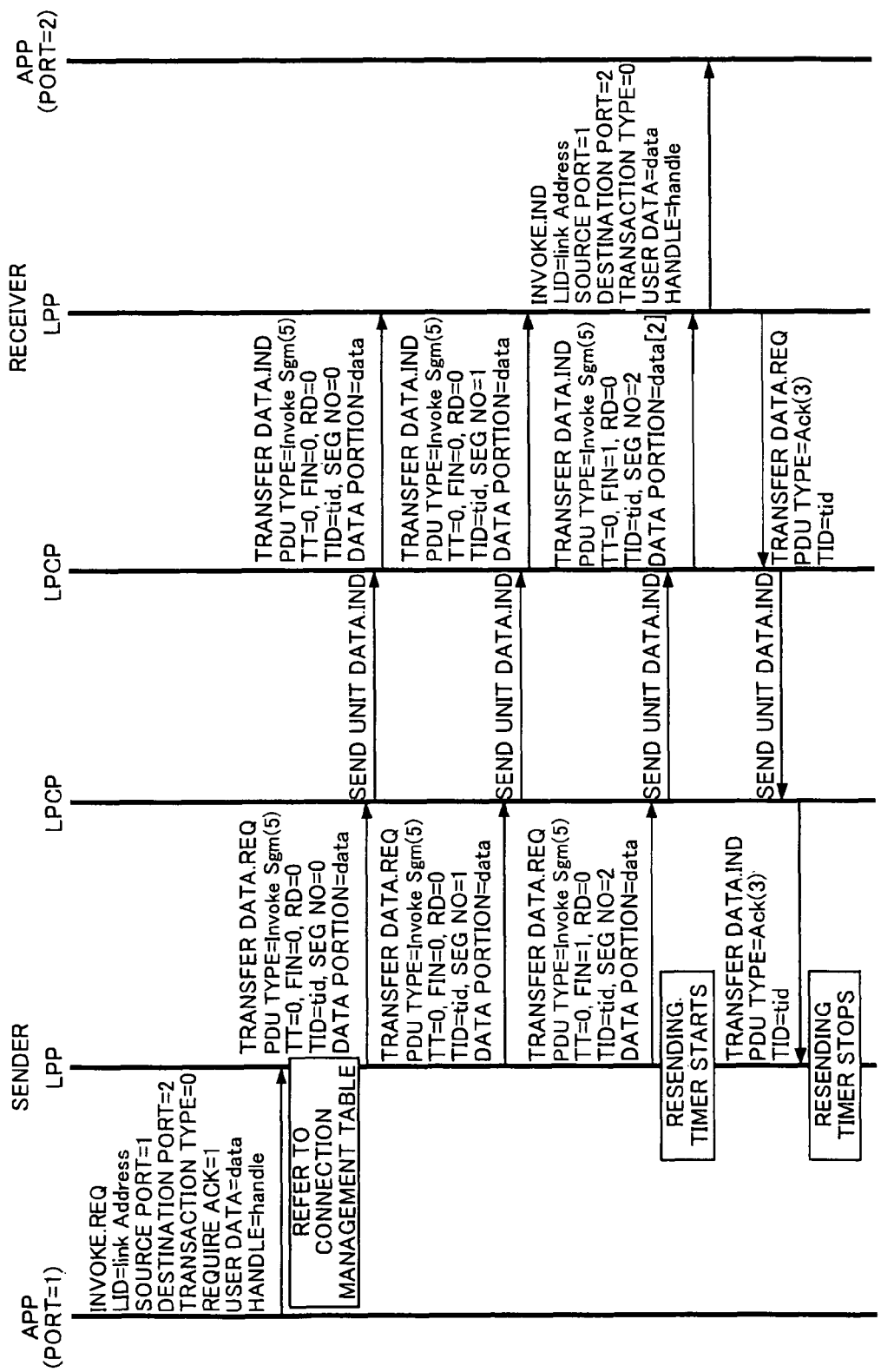
FIG. 62 is a diagram illustrating an example of the sequence when segmentation/assembly processing is enabled.
Figure 63:
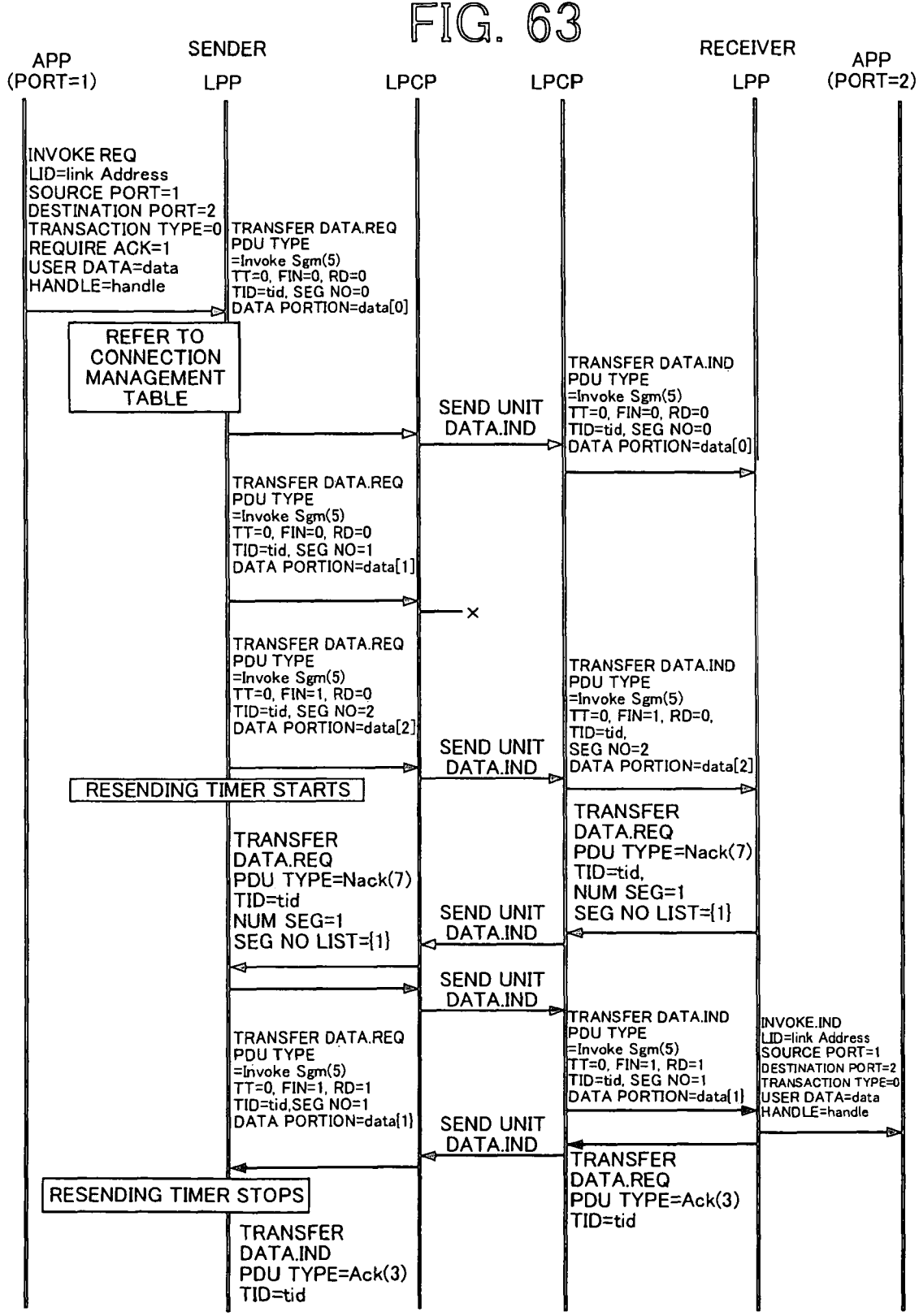
FIG. 63 is a diagram illustrating an example of the sequence (selective resend processing) when segmentation/assembly processing is enabled.
Figure 64:
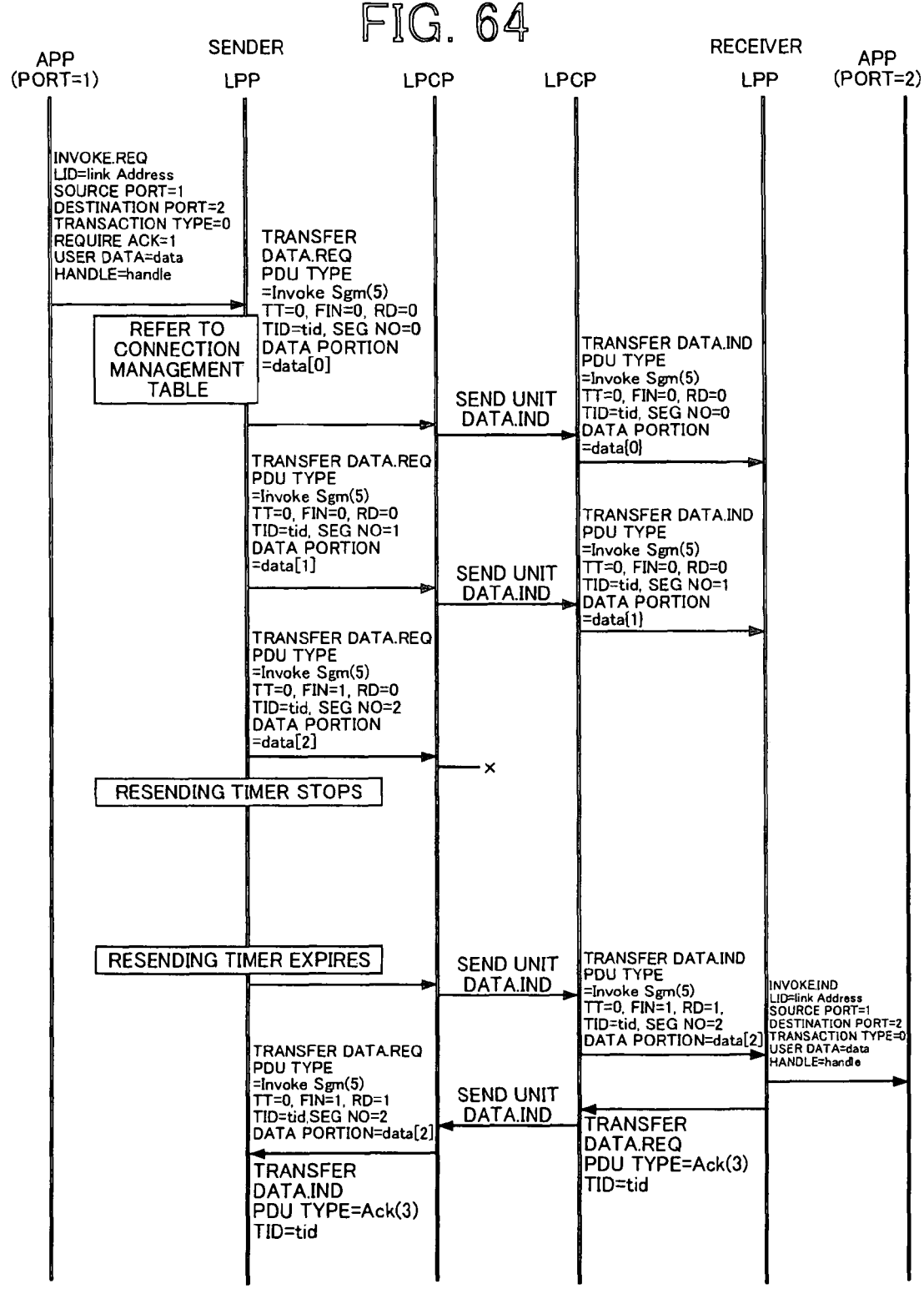
FIG. 64 is a diagram illustrating an example of the sequence when segmentation/assembly processing is enabled (when final segment data has not been received)

FIG. 62 illustrates an example of the basic processing sequence when the segmentation/assembly processing is enabled; FIG. 63 illustrates an example of the processing sequence when part of segmented data is missing, and the selective resend processing is extended; and FIG. 64 illustrates an example of the processing sequence when the final segment data is missing, and the resend processing is extended.

2.5.6 Communication Ending Procedure
(a) The LPP receives from the LPCP the event "DSRC disconnection notification (98)" by means of the event notification primitive (Event Report.ind).
(b) The LPP issues the DSRC disconnection notification primitive (Disconnect.ind) to the application that is using the corresponding link address.
(c) The LPP deletes the connection management table for the LID received by means of the event notification primitive. Thereafter, the LPP does not accept any transaction start request to this link address.

Figure 65:
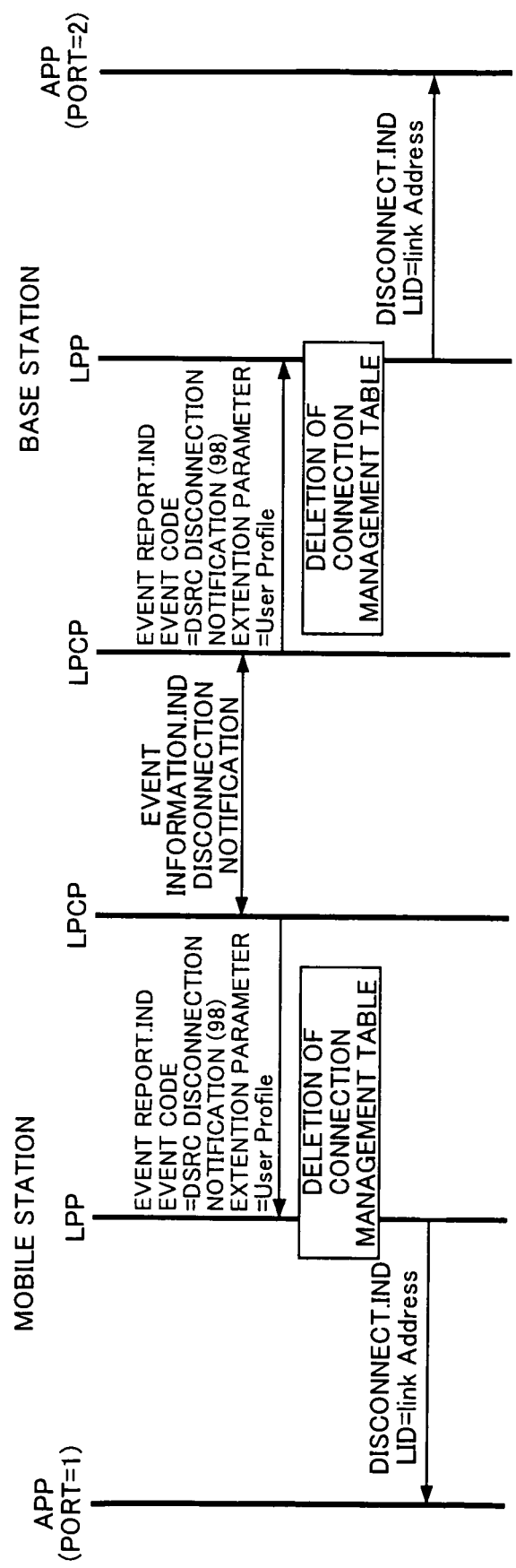
FIG. 65 is a diagram illustrating a procedure when DSRC is disconnected.

FIG. 65 is a diagram illustrating a procedure when DSRC is disconnected.

2.5.7 Transaction Abortion Procedure

Figure 66:
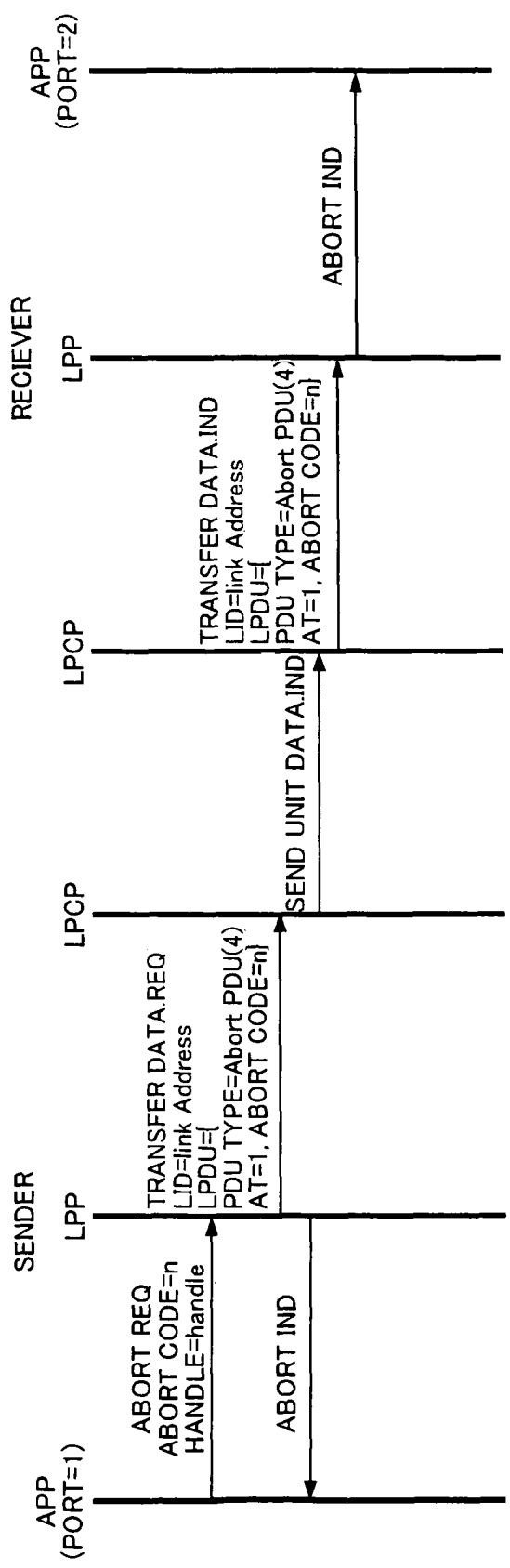
FIG. 66 is a diagram illustrating a transaction abortion procedure.

Application can request the LPP to abort a transaction when the transaction is in the following status:

FIG. 66 is a diagram illustrating a transaction abort procedure.

(1) Sender Side
In the case of request-response-type transaction, duration between the timing of accepting the Request PDU and the timing of issuing Invoke.cnf (2) Receiver Side
In the case of request-response-type transaction, duration between the timing of issuing Invoke.ind and the timing of transmitting the Request PDU The processing sequence of transaction abort procedure will be described below.
(a) When the LPP receives a transaction abort request primitive (Abort.req) from an application, this sequence is started.
(b) The LPP creates the Abort PDU for the transaction designated by means of the transaction abort request primitive, and then sends it to the opposite station by means of the transfer request primitive (Transfer Data.req) of the LPCP.

(c) The LPP issues the transaction abort notification primitive (Abort.ind) to the requesting application, thereby notifying the requesting application that aborting of the transaction has been completed.

(d) When receiving the Abort PDU by means of the transfer notification primitive (Transfer Data.ind) of the LPCP, if a transaction designated by the TID of the PDU is being executed in the own station, the LPP aborts all resources related to that transaction and then issues the transaction abort notification primitive (Abort.ind) to the application, thereby notifying the application that the transaction has been aborted.

In addition, in the foregoing embodiment, a layer structure including the dedicated short range communication (DSRC) protocol (ARIB STD-T75), the application sub-layer extended link control protocol, which is a protocol enabling bidirectional communication (ASL-ELCP), a transfer service processing entity (LPCP), and a transaction management entity (LPP); however, the application sub-layer extended link control protocol (ASL-ELCP) may be replaced by other protocols in which bidirectional communication is possible.

As described above, a roadside-to-vehicle communication system according to the present invention is a communication system in which local applications in both roadside and mobile stations implement communication by utilizing non-network-type protocols and is characterized in that the non-network-type protocols are configured from a transfer service processing entity for implementing multiple applications, and a transaction management entity that includes undelivered data resending means, data sending/receiving means for each message, and message segmenting/assembling means, and that provides unidirectional data transmission and request-response-type transaction services.

In a roadside-to-vehicle communication system according to the present invention, by utilizing port numbers in order to identify applications of both sending and receiving stations, even with non-network-type protocols, concurrent exection of multiple applications is enabled.

A most simple application is enabled by directly utilizing the transfer service processing entity, whereby conditions, such as high-speed connectability and a low overhead, required by roadside-to-vehicle communication while a vehicle is moving can be met.

While the vehicle is in a standstill or moving at a low speed, by utilizing the transaction management entity, the roadside-to-vehicle communication system can readily accommodate even such applications as require high-level communication service such as sending/receiving of large amount of data and request-response-type service.

In extending protocols, localizing of the portion to be extended, within the transaction management entity, allows the extension to be readily implemented.

In addition, the unit of sent data is identified by means of an identifier (a sending data identifier) designated by an application. Moreover, this protocol has a function to divide the data into segments with a transmittable size, to send them with a sequential number attached, and to assemble at the receiving side the segments into the original data, based on the sequential numbers, if the unit of data to be sent exceeds the size of data that can be sent at one time by means of a lower-layer protocol.

In this situation, by notifying the receiving sides of the sequential numbers of undelivered data, when receiving the final data, the communication error rate is improved through resending undelivered data only.

Moreover, in the case where the application identifier of a sending source (sending source port number) and the sending data identifier designated by the application is the same, the receiving side handles the sent data as being identical to the data that has been received by the receiving side and that has the same identifier, whereby resending of data at arbitrary timing is enabled. This allows the communication error rate to be improved even in the case where communication is not possible during a certain period of time.

What is claimed is:

1. A communication system including:
a plurality of mobile stations; and
a base station system communicating with the mobile stations and providing the mobile stations with a plurality of application services, without a network layer protocol, through communication based on an Extended Link Control Protocol (ELCP), as one application of a Dedicated Short-Range Communication (DSRC) protocol, between the mobile stations, which travel on a road, and the base station system, which is located along the road, wherein each of the mobile stations and the base station system comprises
a transfer service processing entity implementing data transfer among the plurality of applications, wherein the transfer service processing entity identifies an application, with one of the mobile stations and the base station system as a sending source, from among the plurality of applications, utilizing port numbers; and
a transaction management entity providing unidirectional data transmission and request-response transactions, wherein the transaction management entity identifies a unit of a transaction between a mobile station and the base station system utilizing a transaction ID uniquely identifying a corresponding port number and an identifier designated by and identifying a respective application, of the plurality of applications, wherein
the transaction management entity includes
undelivered data segment resending means for resending undelivered data segments of a message,
data sending and receiving means for sending and receiving each message of a plurality of messages, and
message segmenting and assembling means for segmenting a message generated by an application into a plurality of data segments and assembling a plurality of data segments of a message into the message,
the transaction management entity of a sending station, of the mobile station and the base station system, when an identifier designated by an application is unchanged, uses the same transaction ID, divides a message into a plurality of data segments and adds to each of the data segments the transaction ID corresponding to the respective port number and one of sequential numbers for transaction identification and sends the message as the plurality of data segments with the transaction ID and sequential numbers, and
the transaction management entity of a receiving station, of the mobile stations and the base station system, reassembles the message sent by combining the data segments having identical transaction IDs, in an order based on the sequential numbers, and processes a newly received data segment identically to the data segment that has been previously received when the transaction ID of the newly received data segment is identical to the transaction ID of the data segment that was previously received.

2. The communication system according to claim 1, wherein, when the transaction management entity of a receiving station, of the mobile stations and the base station system, receives a final data segment of the message, the transaction management entity of the receiving station notifies the transaction management entity of the sending station of the sequential numbers of any undelivered data segments, and the undelivered data resending means of the transaction management entity of the sending station resends only the undelivered data segments.

3. The communication system according to claim 1, wherein the transaction management entity uses a bulk area prepared by an application indicating a buffer region for assembling data segments into a message, and a bulk size indicating size of the buffer region designated by an application, of the plurality of applications.

4. A communication system including:
a plurality of mobile stations;
a base station system communicating with the mobile stations and providing the mobile stations with a plurality of application services, without a network layer protocol, through communication based on an Extended Link Control Protocol (ELCP), as one application of a Dedicated Short-Range Communication (DSRC) protocol, between the mobile stations, which travel on a road, and the base station system, which is located along the road, wherein each of the mobile stations and the base station system comprises
a transfer service processing entity implementing data transfer among the plurality of applications, wherein the transfer service processing entity identifies an application, with one of the mobile stations and the base station system as a sending source, from among the plurality of applications, utilizing port numbers; and
a transaction management entity providing unidirectional data transmission and request-response transactions, wherein the transaction management entity identifies a unit of a transaction between a mobile station and the base station system utilizing a transaction ID uniquely identifying a corresponding port number and an identifier designated by and identifying a respective application, of the plurality of applications, wherein the transaction management entity includes
undelivered data segment resending means for resending undelivered data segments of a message,
data sending and receiving means for sending and receiving each message of a plurality of messages, and
message segmenting and assembling means for segmenting a message generated by an application into a plurality of data segments and assembling a plurality of data segments of a message into the message;
a transfer service processing entity, wherein the transfer service processing entity sends a list of accessible ports registered by applications of the transfer service processing entity to a peer station, of the mobile stations and the base station system, when a DSRC connection is established; and
a transaction management entity providing unidirectional data transmission and request-response transactions, wherein the transaction management entity of the sending station sends, upon receipt of the list of accessible ports, transaction start enable information to an application which has requested starting of a transaction with a port that is included in the list of accessible ports, so that the application starts the transaction.

5. A method of communicating between a roadside unit and an on-board mobile unit in a vehicle through a Dedicated Short-Range Communication (DSRC) protocol, the method including:
receiving a data transmission request from one of a plurality of applications supported by a Local Port Control Protocol (LPCP) layer on a first station for transferring application data to a peer application on a second station, wherein
each application is identified by a unique port number and the application data are associated with a transaction identifier identifying a transaction between the application and the peer application, and
the data transmission request includes a source port number identifying the application and a destination port number identifying the peer application;
converting the application data into data segments in response to the data transmission request, wherein each data segment is identified by a sequence number;
encapsulating into a protocol data unit each of the data segments, the transaction identifier associated with the application data, the sequence number associated with the data segment, the source port number, the destination port number, and an access point identifier, which identifies the LPCP layer;
issuing a send unit data request to an (ELCP) Extended Link Control Protocol layer identified by an application identifier for sending the protocol data unit to the second station; and
encapsulating, in response to the send unit data request, the application identifier with the protocol data unit and passing the protocol data unit that has been encapsulated to a DSRC protocol layer at the first station for transmitting the protocol data unit to the second station in accordance with the DSRC protocol.

6. The method of claim 5, further including:
receiving an open port request from a first application running on the first station, wherein the open port request includes the source port number identifying the first application; and
updating a port list of the first station to include the source port number.

7. The method of claim 6, further including:
sending a packet including one of the segments from the first station to the second station;
starting a timer at the first station;
determining whether an acknowledgement corresponding to the packet is not received by the first station before the expiration of the timer; and
retransmitting the packet from the first station to the second station if the acknowledgement corresponding to the packet is not received by the first station before the expiration of the timer.

* * * * *